US009994271B2

(12) United States Patent
Vanderpool et al.

(10) Patent No.: US 9,994,271 B2
(45) Date of Patent: Jun. 12, 2018

(54) APPARATUS FOR ADJUSTING RELATIVE ORIENTATIONS OF COMPONENTS, AND METHODS OF USE AND MANUFACTURE THEREOF

(71) Applicant: Honda Motor Co., Ltd., Tokyo (JP)

(72) Inventors: Eric Vanderpool, Westerville, OH (US); Bryan Mermoud, Raymond, OH (US); William Tyler Self, Raymond, OH (US); Micah Redwine, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 384 days.

(21) Appl. No.: 14/804,329

(22) Filed: Jul. 20, 2015

(65) Prior Publication Data

US 2017/0021882 A1 Jan. 26, 2017

(51) Int. Cl.
*B62D 65/06* (2006.01)
*B62D 65/02* (2006.01)
*B60J 5/04* (2006.01)

(52) U.S. Cl.
CPC .......... *B62D 65/06* (2013.01); *B62D 65/026* (2013.01); *B60J 5/04* (2013.01)

(58) Field of Classification Search
CPC ........ B62D 65/026; B62D 65/06; B21D 1/12; Y10S 72/705; B25B 11/02; B25B 27/0035; B25H 5/00; B60J 5/00; B60J 5/045; B60J 5/0493; B23P 19/10; Y10T 29/49895; Y10T 29/49902; Y10T 29/49998; Y10T 29/53896; Y10T 29/53909; Y10T 29/53913; Y10T 29/53961

See application file for complete search history.

(56) References Cited

U.S. PATENT DOCUMENTS 2,362,185 A * 11/1944 Brammer ................ F16G 3/003
29/235
3,447,454 A * 6/1969 Ratz ..................... B25H 1/0042
100/266

(Continued)

FOREIGN PATENT DOCUMENTS

DE 102007047670 A1 4/2009

OTHER PUBLICATIONS

Definition of Pedal; Merriam-Webster; Accessed Nov. 16, 2017; https://www.merriam-webster.com/dictionary/pedal.*

*Primary Examiner* — Matthew P Travers
(74) *Attorney, Agent, or Firm* — Kenealy Vaidya LLP

(57) ABSTRACT

Some embodiments are directed to an adjuster for adjusting a position of a vehicle door relative to other vehicle components. The adjuster can include a pin that is configured to be held by a vehicle door latch so as to form a rigid connection between the pin and the vehicle door. The pin can also be configured to be released from the vehicle door latch upon actuation of a vehicle release mechanism. A frame can be supported by a surface that is static relative to the vehicle. An actuator can connect the frame to the pin. The actuator can be configured to enable the vehicle door to be manually raised or lowered by a predetermined distance that facilitates the vehicle door adopting a position that provides enhanced communication between the vehicle door latch and a vehicle striker.

18 Claims, 13 Drawing Sheets

(56) References Cited

U.S. PATENT DOCUMENTS

| | | | | |
|---|---|---|---|---|
| 3,871,055 A | * | 3/1975 | Dail | B23P 19/04 |
| | | | | 29/226 |
| 4,538,335 A | * | 9/1985 | Moore, III | B44D 3/185 |
| | | | | 29/238 |
| 4,561,177 A | * | 12/1985 | Rancer | B23P 19/04 |
| | | | | 269/307 |
| 4,577,843 A | * | 3/1986 | Milwain | B23Q 1/4804 |
| | | | | 269/296 |
| 4,813,264 A | * | 3/1989 | Trice | B21D 1/14 |
| | | | | 72/447 |
| 4,930,337 A | | 6/1990 | Schaap | |
| 5,331,837 A | * | 7/1994 | Stuhlmacher, II | B60J 5/00 |
| | | | | 72/458 |
| 7,987,692 B2 | | 8/2011 | Kiefer, Jr. et al. | |

\* cited by examiner

APPARATUS FOR ADJUSTING RELATIVE ORIENTATIONS OF COMPONENTS, AND METHODS OF USE AND MANUFACTURE THEREOF

BACKGROUND

The disclosed subject matter relates to apparatus for adjusting relative orientations of components, and methods of use and manufacture thereof. More particularly, the disclosed subject matter relates to methods and apparatus for adjusting physical components in a manufacturing or assembly context, such as with regard to enhancing alignment of a vehicle door relative to other components, such as those defining a door opening, those related to door closure (e.g., a striker), etc.

Many types of vehicles, such as those that travel on land, through water, by air, etc., define doors or door openings to allow ingress and egress of vehicle occupants. Some such vehicles include a single door, while others may include multiple doors. The doors can be configured to be opened and closed so that when they are opened, an occupant can enter and exit the vehicle, while when they are closed, the occupant is confined within the vehicle.

SUMMARY

Certain manufacturing tolerances may be relevant to fitting or installing vehicle doors within the associated door opening or with regard to other components, such as those relevant to door closure (e.g., door striker), etc. For example, a door opening may be defined by a certain structure into which the door must be fit with a sufficient tolerance to enable the door to be secured. It may also be beneficial for this tolerance to be sufficient to impede or prevent air, water, debris, etc. from penetrating a gap formed between the door and components defining the door opening (e.g., door frame), which could then travel into an interior of the vehicle. Still further, the door may need to be in a specific position to enable the door to be secured in place, such as by latching with components disposed on the vehicle body.

However, it may be difficult to fit or otherwise install vehicle doors in the door opening relative to the door frame while satisfying appropriate tolerances, especially in the context of mass production, e.g., a vehicle assembly line. For example, after the doors have been assembled and attached to the door frame at the door openings, gaps defined around the door periphery and the door frame may be checked to determine whether or not they satisfy the appropriate tolerances.

This tolerance checking may be relevant or beneficial at various stages of the manufacturing or assembly processes, such as after completion of the vehicle assembly process and at final checkout, i.e., a step in the process where final adjusting and fine tuning (fit and finish) of the vehicle occurs. If the tolerances are not met, such as where the height of the door is off, then the door can be manually adjusted up or down by pulling or pushing, which results in deforming a part of an attachment mechanism of the door to satisfy the tolerances. For example, a technician may pull the door with their arms to lower the door relative to the door frame, or alternatively pull up on the door with their leg and back muscles to raise the door relative to the door frame.

However, the aforementioned operation of manually adjusting the door can be inconvenient and difficult, and also may even be inaccurate. In addition, these movements may create awkward stresses on the technician's body, leading to potential injuries.

Thus it may be beneficial to provide methods and apparatus that address at least one of the above issues. For example, it may be beneficial to provide methods and apparatus to reduce or eliminate the awkward movements, stresses, etc. on the technician's body disclosed above. Instead of a technician using back and arm muscles, it may be beneficial to provide an apparatus that enables this operation to be performed by using the technician's leg muscles to perform this raising and/or lowering of the door relative to the door frame. As one exemplary embodiment, pedals can be used that are configured to be pushed with the technician's foot, such as where pushing one pedal raises the door relative to the door frame, and pushing another pedal pulls the door downwardly to lower the door relative to the door frame.

In accordance with one exemplary operation, the apparatus disclosed above (such as a door adjust apparatus) may be used when a vehicle is disposed at a location in the manufacturing/assembly process where a final weld adjust is performed. A determination can be made as to whether the door is in or out of specification, i.e., whether the tolerances between the door and the door frame are acceptable. If the door is determined to be out of specification, then the technician can connect the door adjust apparatus to the vehicle door, such as by closing the door on a simulated door component (i.e., door striker) of the apparatus. The technician may then press the appropriate pedal of the apparatus with the technician's foot to either raise or lower the door relative to the door frame. The apparatus can be configured to enable the technician to raise or lower the door by a desired amount, such as by pushing the relevant pedal a certain amount, number of times, with a certain amount of force, etc.

Some embodiments are therefore directed to an adjuster for adjusting a position of a vehicle door relative to other vehicle components. The vehicle can include a striker that is configured to communicate with and be held by a latch of the door to enable the door to be held in a fully closed position. The vehicle can also include a release mechanism that enables the striker to be released from the latch to thereby enable the door to be released from the fully closed position and maneuvered into an open position. The adjuster can include a bar that is configured to be held by the vehicle door latch so as to form a rigid connection between the bar and the vehicle door. The bar can also be configured to be released from the vehicle door latch upon actuation of the vehicle release mechanism. A frame can be supported by a surface that is static relative to the vehicle. An actuator can connect the frame to the bar. The actuator can be configured to enable the vehicle door to be manually raised or lowered by a predetermined distance that facilitates the vehicle door adopting a position that provides enhanced communication between the vehicle door latch and the vehicle striker.

Some other embodiments are directed to a method of manufacturing an adjuster for adjusting a position of a vehicle door relative to other vehicle components. The vehicle can include a striker that is configured to communicate with and be held by a latch of the door to enable the door to be held in a fully closed position. The vehicle can also include a release mechanism that enables the striker to be released from the latch to thereby enable the door to be released from the fully closed position and maneuvered into an open position. The method of manufacturing can include: configuring a bar to be held by the vehicle door latch so as to form a rigid connection between the bar and the vehicle door, the bar also being configured to be released from the vehicle door latch upon actuation of the vehicle release mechanism; connecting the bar to a frame with an actuator; and configuring the actuator to enable the vehicle door to be manually raised or lowered by a predetermined distance that facilitates the vehicle door adopting a position that provides enhanced communication between the vehicle door latch and the vehicle striker.

Still other embodiments are directed to a method of adjusting a position of a vehicle door relative to other vehicle components. The vehicle can include a striker that is configured to communicate with and be held by a latch of the door to enable the door to be held in a fully closed position. The vehicle can also include a release mechanism that enables the striker to be released from the latch to thereby enable the door to be released from the fully closed position and maneuvered into an open position. The method can include: opening the vehicle door; moving an adjuster to be proximate the open vehicle door and so as to be supported on a surface that is static relative to the vehicle door; maneuvering a bar of the adjuster so as to be held by the vehicle door latch so as to form a rigid connection between the bar and the vehicle door; manually operating an actuator of the adjuster so as to raise or lower the bar to thereby enable the vehicle door to be raised and lowered by a predetermined distance that facilitates the vehicle door adopting a position that provides enhanced communication between the vehicle door latch and the vehicle striker; and actuating the vehicle release mechanism so that the bar is released from the vehicle door latch after the vehicle door has been positioned to achieve enhanced communication between the vehicle door latch and the vehicle striker.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Certain embodiments of a vehicle door adjuster 10 are disclosed below, and FIGS. 1-16 illustrate some of these embodiments. However, embodiments are intended to include or otherwise cover many different embodiments and structures for determining whether certain vehicular components are placed at acceptable relative positions upon assembly.

I. Overall Features of Exemplary Vehicle Door Adjuster

Figure 1:
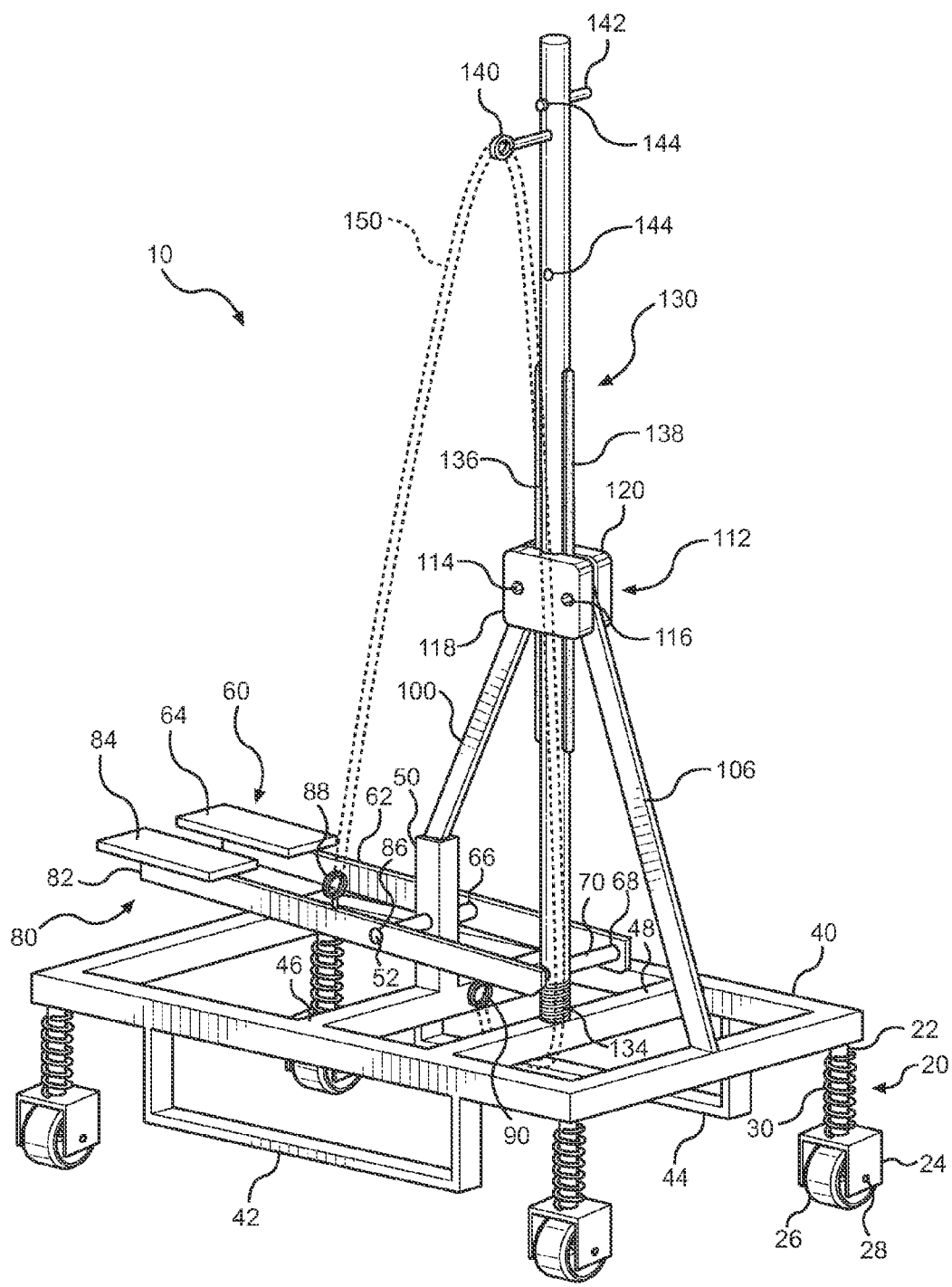
FIG. 1 is a perspective view of an exemplary vehicle door adjuster in accordance with the disclosed subject matter.

FIG. 1 is a perspective view of an exemplary vehicle door adjuster 10 in accordance with the disclosed subject matter.

Figure 15:
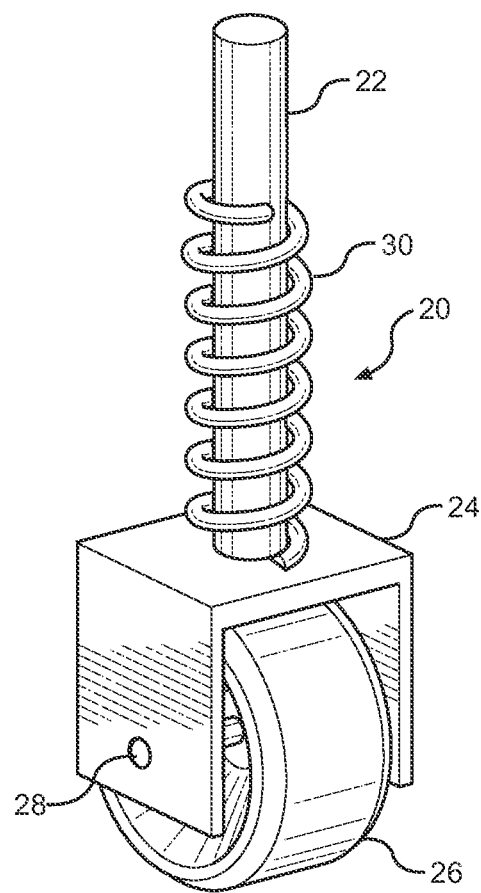
FIG. 15 is a perspective view of an exemplary caster assembly of the vehicle door adjuster of FIG. 1 in accordance with the disclosed subject matter.
Figure 16:
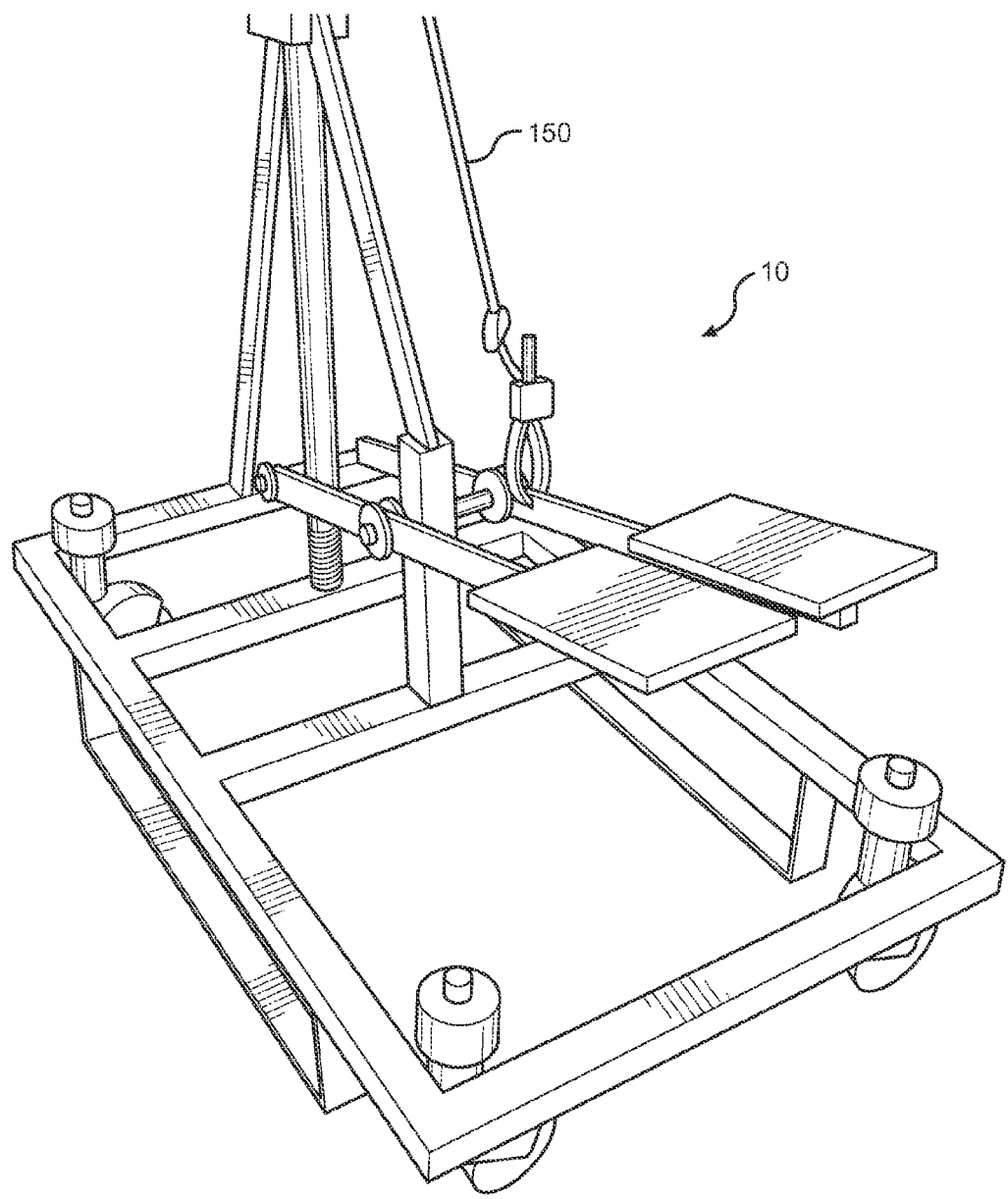
FIG. 16 is a perspective view of a lower portion of an alternative embodiment of the vehicle door adjuster of FIG. 1 in accordance with the disclosed subject matter.

As shown in FIG. 1, and in more detail in FIG. 15, the vehicle door adjuster 10 includes caster assemblies 20 at a bottom portion of the vehicle door adjuster 10 that contact a surface on which the vehicle door adjuster 10 is supported, such as the ground. In the present embodiment, one of the caster assemblies 20 is positioned at each of four corners of the bottom portion of the vehicle door adjuster 10. However, other embodiments can include any number of caster assemblies 20, such as five, three, two, or even no caster assemblies 20. In the instance where no caster assemblies 20 are included, alternative support assemblies such as feet may be added.

The caster assemblies 20 support the vehicle door adjuster 10, and allow the vehicle door adjuster 10 to be easily moved along a surface, such as the ground. As indicated above, other structures may be used to perform support and movement operations of the vehicle door adjuster 10.

Each of the caster assemblies 20 contacts the ground surface via a wheel 26 retained within the corresponding caster assembly 20. Each wheel 26 in the exemplary embodiment is cylindrical in shape, and retained via a wheel axle 28 inserted through a center of the wheel 26. However, other types of wheels 26, such as spheres or balls can also be used. Additionally, grooves matched to an outer surface of the wheel 26 can be used instead of a wheel axle 28 to retain each wheel 20, such as in a ball bearing-type setup.

The wheels 26 serve to provide low rolling resistance when moving the vehicle door adjuster 10 along a surface, such as the ground. As indicated above, other structures may be used to achieve low rolling resistance when moving the vehicle door adjuster 10.

Each wheel 26 is retained within a caster housing 24 of the corresponding caster assembly 20. The caster housing 24 surrounds a portion of the wheel 26 and defines holes in opposing sides through which the wheel axle 28 in inserted. The wheel axle 28 passes through a center of the wheel 26 to hold the wheel 26 in place. However, a type of caster housing 24 that does not require the wheel axle 28 can alternatively be used, such as a housing with grooves to retain the wheel 26, as in the aforementioned ball bearing-type setup.

Each caster housing 24 serves to retain the wheel 26 within the corresponding caster assembly 20 and facilitate rotation of the wheel 26. As indicated above, other structures may be used to retain and facilitate rotation of the wheels 26.

A caster assembly shaft 22 is attached to a top side of each caster housing 24. The caster assembly shaft 22 extends upward and away from the ground surface. The caster assembly shaft 22 in the exemplary embodiment is cylindrical in shape, but can also be other shapes such as a rectangular prism. The caster assembly 20 can also lack a caster assembly shaft 22 altogether. When included, each caster assembly shaft 22 can be attached to a center of the top side of the caster housing 24. Alternatively, each caster assembly shaft 22 can be attached at any other position of the caster housing 24. The caster assembly shaft 22 can be attached to the caster housing 24 via welding, through use of adhesives, or attachment fixtures such as screws and bolts, etc.

Upper portions of each caster assembly shaft 22 can be attached to a frame 40, such as to enable rotation, which is described below. The caster assembly shafts 22 are inserted into recesses in a frame 40, which secures attachment between the caster assembly shafts 22 and the frame 40 while allowing the caster assemblies 20 to pivot about the caster assembly shafts 22. The caster assembly shafts 22 can be press-fitted into the recesses in the frame 40, or may alternatively be attached through use of attachment fixtures, such as screws and bolts, etc.

In some embodiments, the caster assembly shafts 22 can be rigidly fixed to the frame 40 and unable to rotate. Rigidly fixed caster assembly shafts 22 may be attached to the frame 40 via welding, through use of adhesives, or attachment fixtures such as screws and bolts, etc. Furthermore, an embodiment may have some rotatably attached caster assembly shafts 22 and some rigidly fixed caster assembly shafts 22.

Additionally, the upper portions of each caster assembly shaft 22 are slideably inserted into the recesses in the frame 40, such that the caster assembly shafts 22 can move up and down within a vertical space defined by each recess. The caster assembly shafts 22 can be slid up into the corresponding recesses to fill the vertical space, thereby bringing the frame 40 closer to the wheels 26. Consequently, such movement of the caster assembly shafts 22 within the recesses of the frame 40 brings the vehicle door adjuster 10 closer to a surface such as the ground. Conversely, the caster assembly shafts 22 can be slid down within the corresponding recesses to open up the vertical space, thereby moving the frame 40 farther from the wheels 26. Consequently, such movement of the caster assembly shafts 22 within the recesses of the frame 40 moves the vehicle door adjuster 10 farther from a surface such as the ground. The movement of each caster assembly shaft 22 within the corresponding recesses of the frame 40 is facilitated by a caster spring 30, which is described below.

Alternatively, the caster assembly shafts 22 can be telescoping so that a top portion slides into a recess within a bottom portion of each caster assembly shaft 22. The bottom portion can likewise be configured to slide into the top portion of each caster assembly shaft 22 to maintain the telescoping function.

The caster assembly shafts 22 support the frame 40 on the corresponding caster assemblies 20, and permit the caster assemblies 20 to rotate. By supporting the frame 40, the caster assembly shafts 22 elevate the frame 40 above a surface, such as the ground. Furthermore, the caster assembly shafts 22 allow the vehicle door adjuster 10 to be moved more easily because the caster assemblies 20 can be rotated to guide the vehicle door adjuster 10 along a surface such as the ground. As indicated above, other structures may be used to support the caster assemblies 20 on the frame 40, and to permit the caster assemblies 20 to rotate.

Additionally, because the caster assembly shafts 22 are slideably inserted within recesses in the frame 40, the vehicle door adjuster 10 can be brought closer to or moved farther away from a surface such as the ground. The vehicle door adjuster 10 being brought closer to the ground allows grounding extensions 42 and 44 to contact the ground and stabilize the vehicle door adjuster 10, as detailed below. When the vehicle door adjuster 10 is moved farther away from the ground, the frame 40 moves away from the ground and the grounding extensions 42 and 44 cannot contact the ground, permitting the vehicle door adjuster 10 to be transported freely. As indicated above, other structures may be used to move the vehicle door adjuster 10 closer to and farther away from a surface such as the ground.

The caster spring 30 can extend around the caster assembly shaft 22 approximately the length of (and so as to be coaxial with) the caster assembly shaft 22. The caster spring 30 contacts the top side of the caster housing 24 at one end, and contacts a bottom side of the frame 40, which will be described below, at the other end. An elastic member, such as a rubber stoppers can alternatively be used instead of the caster spring 30. Furthermore, some embodiments do not include any spring or elastic member.

Each caster spring 30 serves to bias the caster assembly shaft 22 within the corresponding caster assembly 20 to extend farther from a bottom of the frame 40 and therefore push the frame 40 farther away from the ground. By moving the frame 40 farther away from the ground, the caster springs 30 facilitate a loss of contact between the grounding extensions 42 and 44 to thereby enable the vehicle door adjuster 10 to be freely transported along the ground. As indicated above, other structures may be used to bias relative positions of the caster assembly shafts 22 within corresponding recesses of the frame 40.

In the present embodiment, the frame 40 of the vehicle door adjuster 10 is attached to tops of the caster assembly shafts 22. The frame 40 can be metal, plastic, or an alloy or composite. The frame 40 has a rectangular perimeter, however the perimeter can also be circular, triangular or otherwise polygonal. The frame 40 can be attached to the caster assembly shafts 22 by welding, use of adhesives or attachment fixtures such as screws or bolts, etc. The caster assembly shafts 22 are attached at each of the four corners of the frame 40, however the caster assembly shafts 22 can be attached to any parts of the frame.

The frame 40 serves to provide overall structure and support for the vehicle door adjuster 10. As indicated above, other configurations may be used to achieve structure and support of the vehicle door adjuster 10.

Grounding extensions 42 and 44 are attached to a bottom side of the frame 40 and extend towards a surface, such as the ground. The grounding extensions 42 and 44 are attached to the frame 40 by welding, use of adhesives or attachment fixtures such as screws or bolts, etc. The grounding extensions 42 and 44 have flat bottoms extending along sides of the frame 40 and are attached to the frame 40 by two legs. The flat bottoms of the grounding extensions 42 and 44 each have a width equal to a width of the sides of the frame 40. Alternatively the flat bottoms of the grounding extensions 42 and 44 can be wider or thinner than the sides of the frame 40. The grounding extensions 42 and 44 are positioned on opposing sides of the frame 40, but can be positioned along any portion of the frame 40.

The grounding extensions 42 and 44 serve to provide stability for the vehicle door adjuster 10 during use. As indicated above, other structures may be used to achieve stability of the vehicle door adjuster 10.

The frame 40 also has a pedal crossbar 46 and a rod crossbar 48, each extending through an interior of the frame 40 to connect opposing sides of the frame 40. The pedal crossbar 46 and the rod crossbar 48 are spaced apart and extend parallel to one another, while being perpendicular to the frame 40 at the connection points. The pedal crossbar 46 and the rod crossbar 48 extend perpendicular to the grounding extensions 42 and 44, however the pedal crossbar 46 and the rod crossbar 48 can also extend parallel to the grounding extensions 42 and 44. The pedal crossbar 46 and the rod crossbar 48 may be formed from metal, plastic, or another alloy or composite and can be attached to the frame 40 by welding, use of adhesives or fixtures such as screws or bolts, etc.

A pedal post 50 is attached to a center of a top side of the pedal crossbar 46. The pedal post 50 is rectangular in cross section, but may also be formed as a cylinder or otherwise. The pedal post 50 extends upwards away from the ground surface and is attached to the pedal crossbar 46 by welding, use of adhesives or fixtures such as screws or bolts, etc. The pedal post 50 can be formed from metal, plastic, or any another alloy or composite. The pedal post 50 also has a post pin 52 extending through a hole in the pedal post 50 parallel to the pedal crossbar 46.

The pedal crossbar 46, rod crossbar 48 and pedal post 50 serve to connect operative elements of the vehicle door adjuster 10 to the frame 40. As indicated above, other structures may be used to connect operative elements of the vehicle door adjuster 10.

Figure 9:
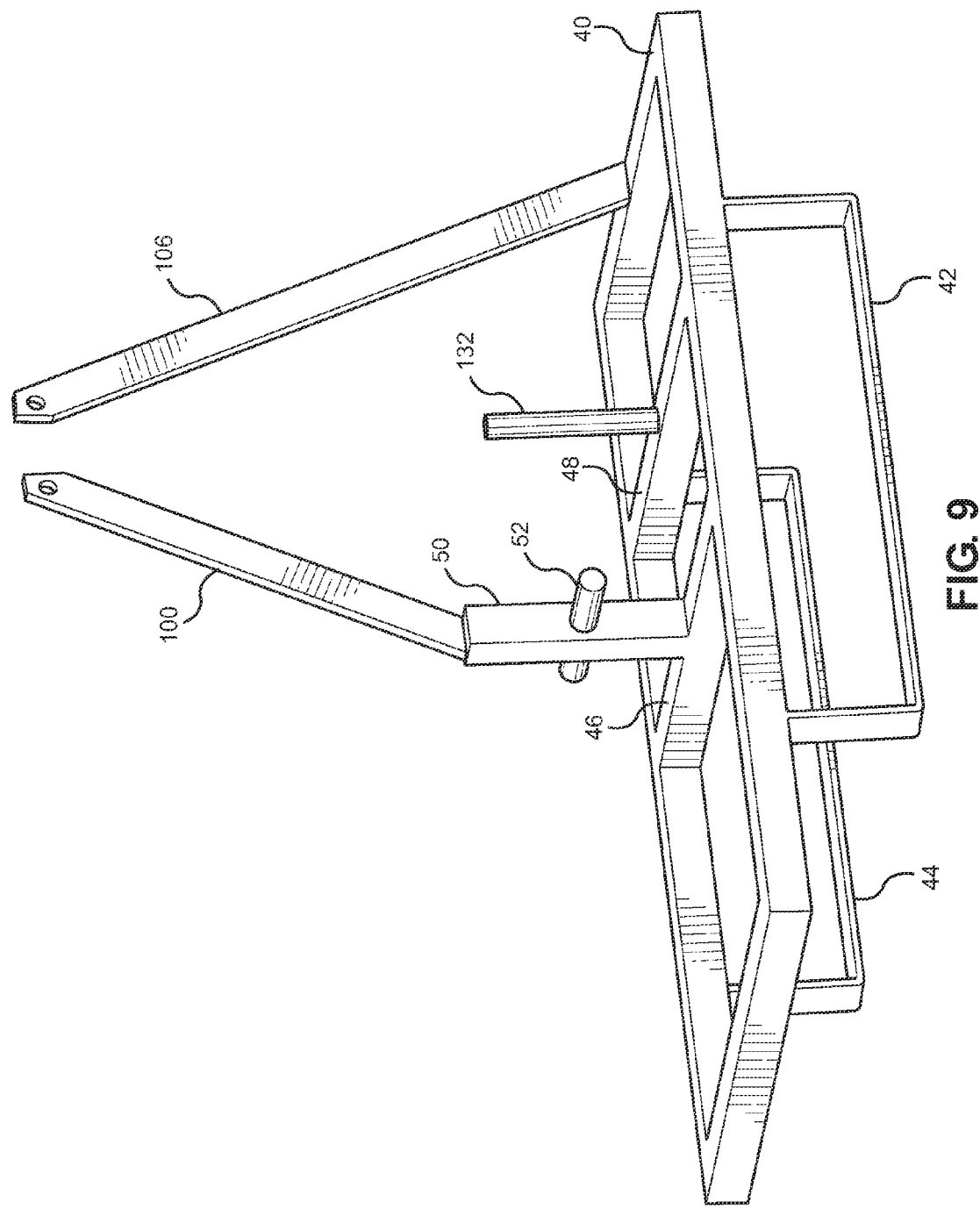
FIG. 9 is a perspective view of an exemplary frame of the vehicle door adjuster of FIG. 1 in accordance with the disclosed subject matter.

Also as shown in more detail in FIG. 9, an adjusting rod guide extension 132 is attached to a center of a top side of the rod crossbar 48. The adjusting rod guide extension 132 is cylindrical, but may also be formed with a rectangular or otherwise polygonal cross section. The adjusting rod guide extension 132 extends upward from the rod crossbar 48 and is attached by welding, use of adhesives or fixtures such as screws or bolts, etc. The adjusting rod guide extension 132 is formed from metal, plastic, or another alloy or composite. In the present embodiment, the adjusting rod guide extension 132 extends to a height less than that of a height of the pedal post 50, however the adjusting rod guide extension 132 can also extend to the same height as the pedal post 50, or even a greater height.

The adjusting rod guide extension 132 serves to provide support for and align an adjusting rod 130 that is described below. As indicated above, other structures may be used to provide support for and align the adjusting rod 130 along a path of movement of the adjusting rod 130.

An end of the aforementioned post pin 52 is rotatably connected to a raising pedal 60, while another end of the post pin 52 is rotatably connected to a lowering pedal 80. In this manner, the post pin 52 rotatably connects both the raising pedal 60 and the lowering pedal 80 to the pedal post 50. However, the raising pedal 60 and the lowering pedal 80 can also be connected to the post pin 52 via separate and distinct members.

The post pin 52 serves to connect the raising pedal 60 and the lowering pedal 80 to the frame 40. As indicated above, other structures may be used to connect the raising pedal 60 and the lowering pedal 80.

Figure 14:
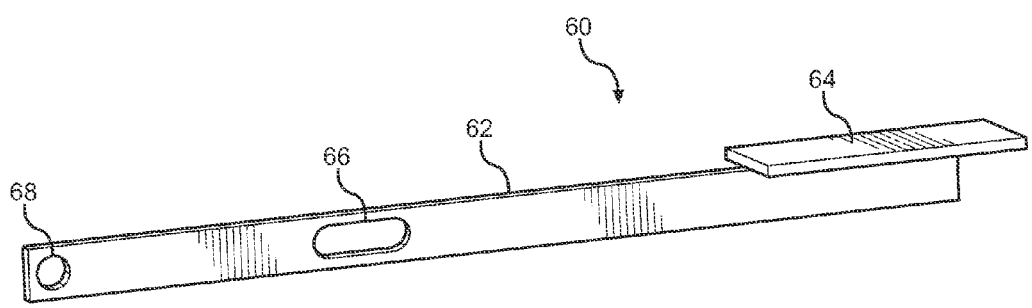
FIG. 14 is a perspective view of an exemplary raising pedal of the vehicle door adjuster of FIG. 1 in accordance with the disclosed subject matter.

As shown in more detail in FIG. 14, the raising pedal 60 includes a raising pedal platform 64 attached to an end of a raising beam 62. The raising pedal platform 64 can be attached to the raising beam 62 by welding, use of adhesives or attachment fixtures such as screws or bolts, etc. In the present embodiment, the raising pedal platform 64 is rectangular, however the raising pedal platform 64 can also be circular or otherwise polygonal. Furthermore, some embodiments do not include any raising pedal platform 64. The raising beam 62 also has a raising post slot 66 through which the post pin 52 is inserted to rotatably connect the raising pedal 60 and the pedal post 50. The raising post slot 66 is formed at an intermediate portion of the raising beam 62. The raising beam 62 includes an adjusting rod hole 68 at an end opposite the raising pedal platform 64 through which a base pin 70 extends to rotatably connect the raising beam 62 to the adjusting rod 130 that will be described below.

The raising pedal 60 allows a user to raise the adjusting rod 130 and consequently raise a vehicle door. As indicated above, other structures may be used to raise the adjusting rod 130.

Figure 13:
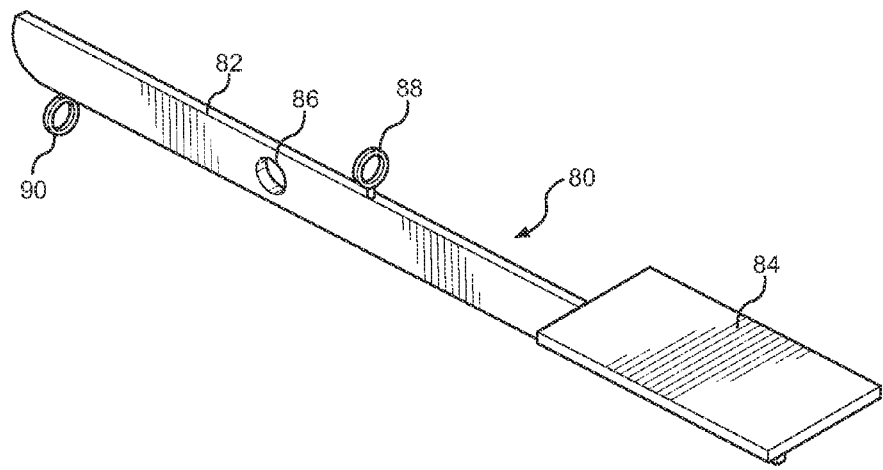
FIG. 13 is a perspective view of an exemplary lowering pedal of the vehicle door adjuster of FIG. 1 in accordance with the disclosed subject matter.

As shown in more detail in FIG. 13, the lowering pedal 80 includes a lowering pedal platform 84 attached to an end of a lowering beam 82. The lowering pedal platform 84 can be attached to the lowering beam 82 by welding, use of adhesives or attachment fixtures such as screws or bolts, etc. In the present embodiment, the lowering pedal platform 84 is rectangular, however the lowering pedal platform 84 can also be circular or otherwise polygonal. Furthermore, some embodiments do not include any lowering pedal platform 84. The lowering beam 82 also has a lowering post hole 86 through which the post pin 52 is inserted to rotatably connect the lowering pedal 80 and the pedal post 50. The lowering post hole 66 is formed at an intermediate portion of the lowering beam 82. The lowering beam 82 also includes an intermediate hook 88 and an end hook 90, which are connected to opposing ends of a cable 150 that will be described below.

The lowering pedal 80 allows a user to lower the adjusting rod 130 by pulling down on a cable 150 connected to the adjusting rod 130, thereby lowering a vehicle door. As indicated above, other structures may be used to lower the adjusting rod 130.

The intermediate hook 88 is attached to a top surface of the lowering beam 82 at an intermediate position between the lowering pedal platform 84 and the post pin 52. The intermediate hook 88 can be attached to the lowering beam 82 by welding, use of adhesives or fixtures such as screws or bolts, etc. Alternatively, the intermediate hook 88 can be formed as an eyelet, an open-ended hook, a slit or hole in the lowering beam 82, or another attachment structure.

The intermediate hook 88 serves to attach an end of the cable 150 to an intermediate portion of the lowering pedal 80. As indicated above, other structures may be used to attach the cable 150 to the intermediate portion the lowering pedal 80.

The end hook 90 is attached to a bottom surface of the lowering beam 82 at an end opposite the lowering pedal platform 84. The end hook 90 can be attached to the lowering beam 82 by welding, use of adhesives or fixtures such as screws or bolts, etc. Additionally, the end hook 90 can be formed as an eyelet, an open-ended hook, a slit or hole in the lowering beam 82, or another attachment structure.

The end hook 90 serves to attach another end of the cable 150 to an end portion of the lowering pedal 80. As indicated above, other structures may be used to attach the cable 150 to the end portion of the lowering pedal 80.

The present embodiment also has a post brace 100 and a frame brace 106 extending from the pedal post 50 and the frame 40, respectively. Alternative embodiments may have more or fewer braces, and braces may extend from other locations of the frame 40.

The post brace 100 is attached to a top of the pedal post 50 and extends upward to connect to a side of a guide block 112 by a first pin 114. The guide block 112 is centered above the rod crossbar 48, and is also connected to the frame 40 via the frame brace 106. The frame brace 106 is attached to a perimeter section of the frame 40 and extends upward to connect to an opposing side of the guide block 112 via a second pin 116. The post brace 100 and frame brace 106 connect to opposing sides of the guide block 112. The post brace 100 and frame brace 106 can, however, connect to the same side of the guide block 112 in an alternative embodiment.

The post brace 100 and the frame brace 106 serve to support the guide block 112 and thereby facilitate controlled movement of the adjusting rod 130. As indicated above, other structures may be used to support the guide block 112 and control adjusting rod 130 movement.

Figure 10:
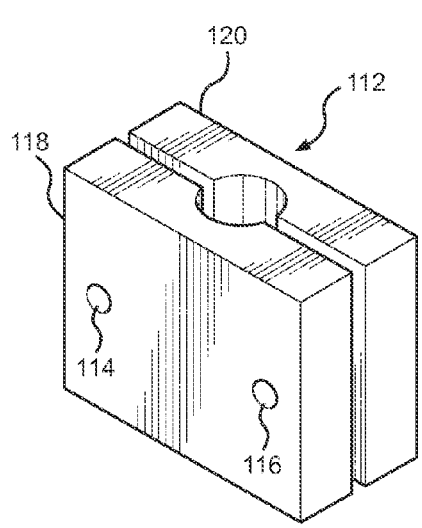
FIG. 10 is a perspective view of an exemplary guide block of the vehicle door adjuster of FIG. 1 in accordance with the disclosed subject matter.

Also as shown in more detail in FIG. 10, the guide block 112 has two halves 118 and 120 joined together via the first pin 114 and the second pin 116, with ends of the post brace 100 and the frame brace 106 sandwiched between the two halves 118 and 120 at the respective pins 114, 116. Because of this joinder, the two halves 118 and 120 of the guide block 112 are spaced apart by a gap equivalent to a thickness of the ends of the post brace 100 and the frame brace 106 that are sandwiched between the two halves 118 and 120. The two halves 118 and 120 may also be joined together by a greater or fewer number of pins, or by another mechanism such as adhesion or welding. The two halves 118 and 120 of the guide block 112 have contoured inner surfaces that define a hole extending through a center of the guide block 112 to facilitate the passing through of the adjusting rod 130. The contoured inner surfaces of the two halves 118 and 120 can be substantially semi-cylindrical or otherwise concave.

The guide block 112 serves to guide the adjusting rod 130 as the adjusting rod 130 moves up and down via actuation of the raising pedal 60 and the lowering pedal 80. As indicated above, other structures may be used to guide movement of the adjusting rod 130.

The aforementioned adjusting rod 130 is cylindrical and extends from the rod crossbar 48 to a point above the guide block 112 at a top portion of the vehicle door adjuster 10, with an intermediate portion of the adjusting rod 130 passing through the hole through the center of the guide block 112. A base of the adjusting rod 130 is hollow and surrounds a portion of the adjusting rod guide extension 132 at the center of the rod crossbar 48. A rod spring 134 extends around an exposed portion of the adjusting rod guide extension 132 that is not surrounded by the adjusting rod 130. An end of the rod spring 134 abuts the top surface of the rod crossbar 48, while an opposite end of the rod spring 134 abuts a base of the adjusting rod 130. An elastic member other than the rod spring 134 may be used, such as a rubber stopper. Further, some embodiments do not include any spring or elastic member.

Figure 11:
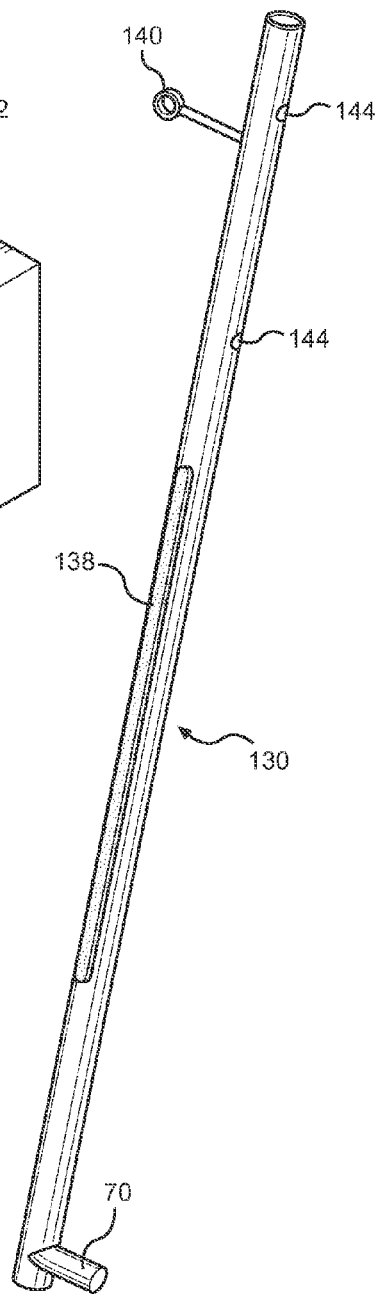
FIG. 11 is a perspective view of an exemplary adjusting rod of the vehicle door adjuster of FIG. 1 in accordance with the disclosed subject matter.
Figure 12:
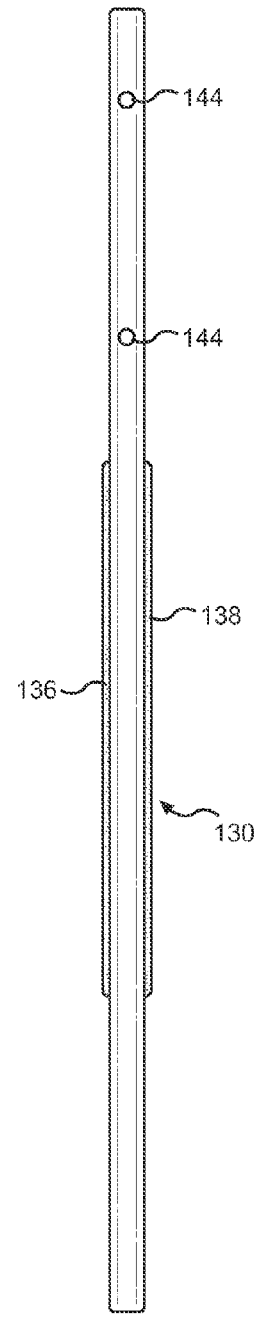
FIG. 12 is a side view of the exemplary adjusting rod of the vehicle door adjuster of FIG. 1 in accordance with the disclosed subject matter.

As shown in more detail in FIG. 11, the adjusting rod 130 also includes the base pin 70 extending perpendicular from the base of the adjusting rod 130 and through the adjusting rod hole 68 of the raising beam 62. The base pin 70 is cylindrical and rotatably connects the adjusting rod 130 to the raising beam 62.

The adjusting rod 130 serves to transfer movement of the raising pedal 60 and the lowering pedal 80 to movement of a vehicle door. As indicated above, other structures may be used to transfer user input to movement of the vehicle door.

Figure 6:
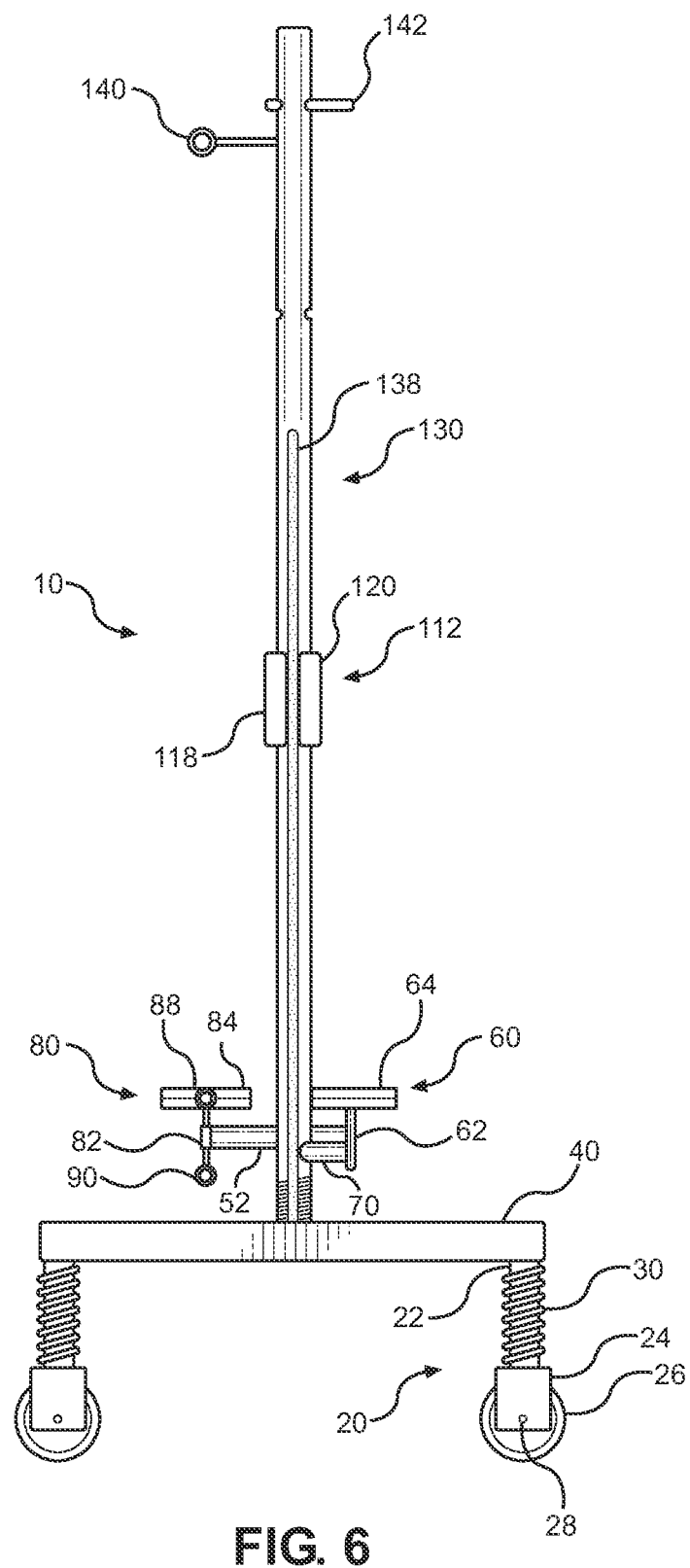
FIG. 6 is a front view of the exemplary vehicle door adjuster of FIG. 1 in accordance with the disclosed subject matter.
Figure 7:
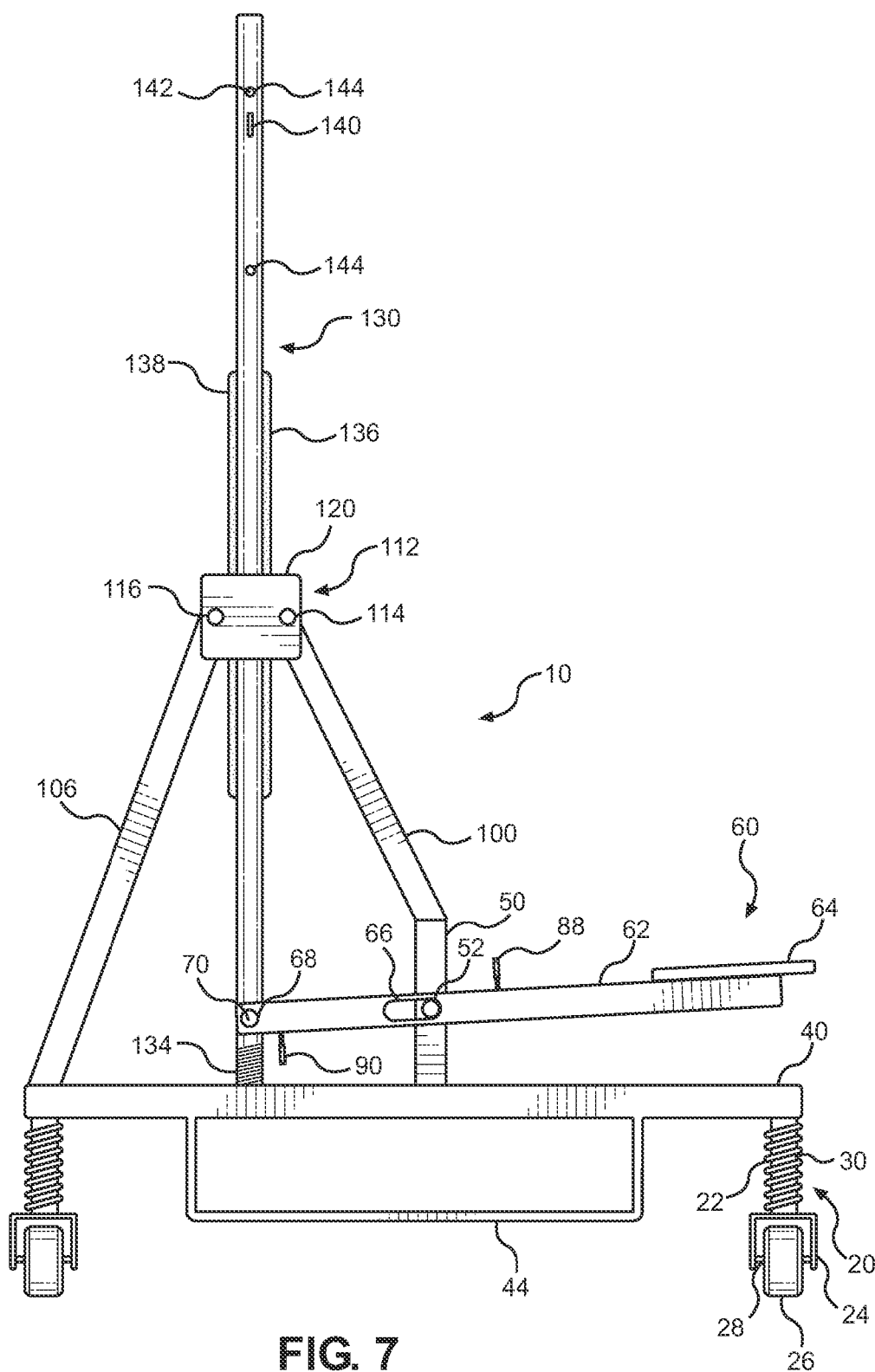
FIG. 7 is a side view of the exemplary vehicle door adjuster of FIG. 1 in accordance with the disclosed subject matter.
Figure 8:
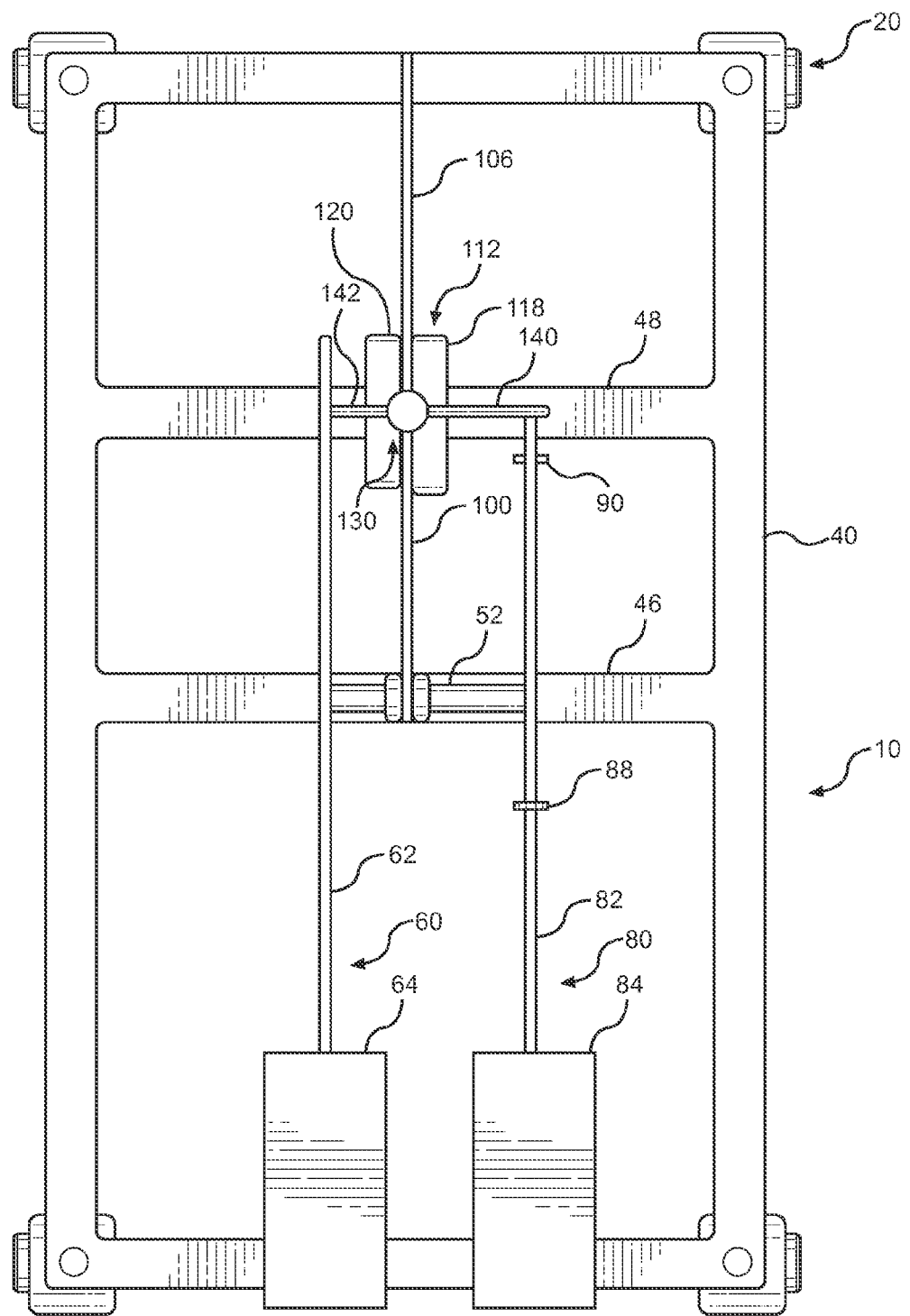
FIG. 8 is a top view of the exemplary vehicle door adjuster of FIG. 1 in accordance with the disclosed subject matter.

As shown in more detail in FIGS. 6 and 7, the adjusting rod 130 has a first guide 136 and a second guide 138 extending along opposing sides of the adjusting rod 130. The first guide 136 and the second guide 138 are formed as ridges along a length of the adjusting rod 130, and are slideably engaged with the gap formed between the two halves 118 and 120 of the guide block 112. The first guide 136 and the second guide 138 of the present embodiment do not extend the entire length of the adjusting rod 130, however they may be configured to do so.

A rod hook 140 is disposed proximate a distal end of the adjusting rod 130 opposite the base. The cable 150 is passed through the rod hook 140. The rod hook 140 can be formed as an eyelet, an open-ended hook, a slit or hole in the adjusting rod 130, or another attachment structure.

The first guide 136 and the second guide 138 serve to align and guide movement of the adjusting rod 130 in up and down directions through the guide block 112. The rod hook 140 serves to connect the cable 150 to the adjusting rod 130 so that pulling down on the cable 150 moves the adjusting rod 130 down. As indicated above, other structures may be used to guide and move the adjusting rod 130 up and down.

The adjusting rod 130 also has a pair of extension holes 144 extending through a center of the top portion of the adjusting rod 130. The pair of extension holes 144 includes an upper extension hole 144 and a lower extension hole 144 at relative positions along the adjusting rod 130. A distance separating the pair of extension holes 144 is approximately defined by a difference in height between a rear door latch and a front door latch of the vehicle 190. There can also be just one extension hole, or a number in excess of two such as three, four, five, etc. with varying separation distances. Additionally, the pair of extension holes 144 can extend perpendicular to the direction of elongation of the adjusting rod 130, and can be oriented to align with an elongated portion of the rod hook 140.

An connection pin 142 is inserted through either the upper or lower extension hole 144 and protrudes so as to be engageable with a latch protrusion (not shown) of a vehicle door, as described below. The connection pin 142 is substantially cylindrical, and is formed so as to be retained within the pair of extension holes 144. Therefore, the connection pin 142 may be a spring pin or may have locking clips to keep the spring pin 142 in place.

The aforementioned cable 150 can be woven metal or metal alloys, or alternatively may be made of rope or other fibrous materials. The cable 150 is passed through the rod hook 140 and attached to the intermediate hook 88 of the lowering beam 82 at an end of the cable 150. The other end of the cable 150 is passed around the rod crossbar 48 and attached to the end hook 90 of the lowering beam 82. Specifically, the other end of the cable 150 passes below the frame 40 through a space between the rod crossbar 48 and a front end of the perimeter of the frame 40, and is then looped around an underside of the rod crossbar 48 so as to pass above the frame 40 through a space between the rod crossbar 48 and the pedal crossbar 46, the other end of the cable 150 ultimately terminating at the end hook 90 to which it is attached. The other end of the cable 150 may alternatively be looped around different components of the frame 40 before being attached to the end hook 90, such as the pedal crossbar 46.

Because the cable 150 is connected to the lowering pedal 80 and the adjusting rod 130, the cable 150 serves to lower the adjusting rod 130 by transferring movement of the lowering pedal 80. As indicated above, other structures may be used transfer movement of the lowering pedal 80 to the adjusting rod 130.

As shown in more detail in FIGS. 2-5, the connection pin 142 can be removably inserted into the upper or lower extension holes 144 at the top portion of the adjusting rod 130.

The connection pin 142 serves to engage the adjusting rod 130 with the vehicle door so that movement of the adjusting rod 130 moves the vehicle door up or down. However, other structures may be used to engage the adjusting rod 130 with the vehicle door.

II. Vehicle Door Adjuster with Vehicle Door

Figure 2:
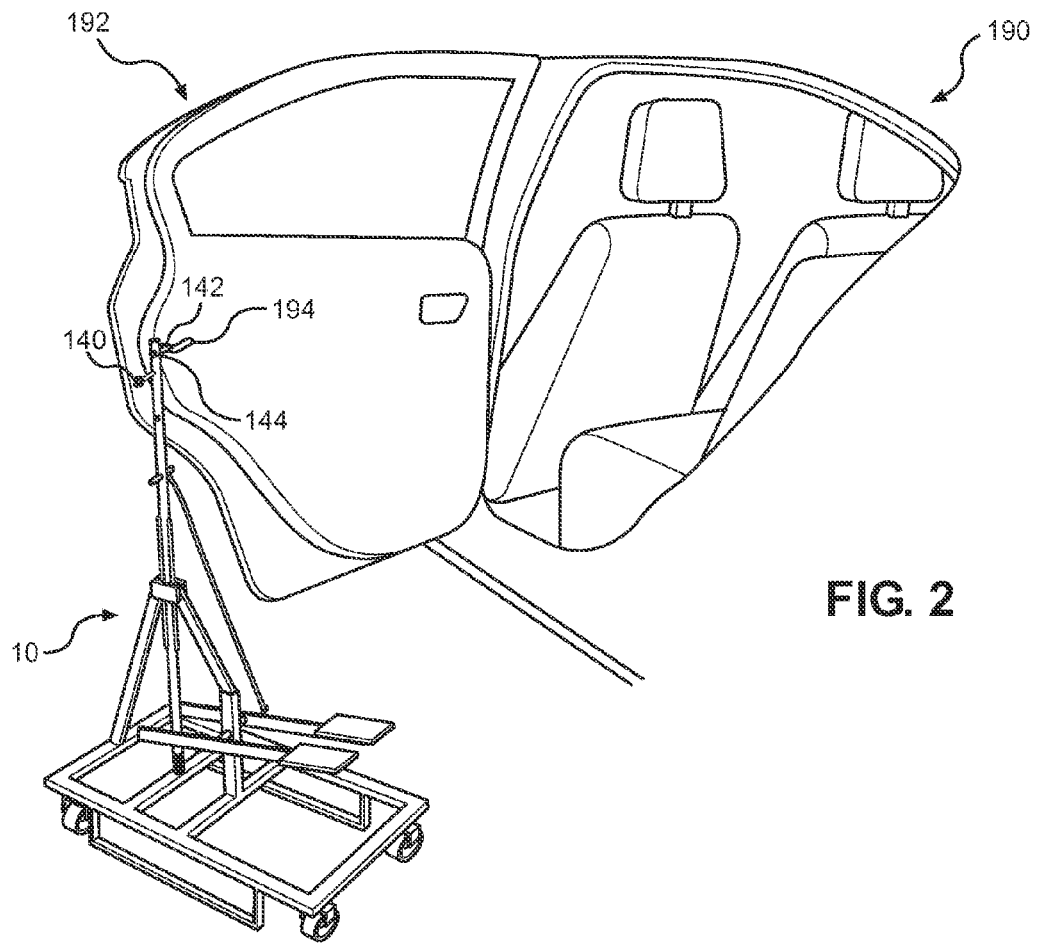
FIG. 2 is a perspective view of the exemplary vehicle door adjuster of FIG. 1 in use with an exemplary vehicle.

FIG. 2 is a perspective view of the exemplary vehicle door adjuster of FIG. 1 in use with an exemplary vehicle. FIG. 2 particularly illustrates an embodiment of the vehicle door adjuster 10, made in accordance with the principles of the disclosed subject matter, in use with a vehicle 190. As shown, the vehicle 190 has a rear door 192 that is in an open position. The rear door 192 includes a latch slot 194 configured to engage with a vehicle striker (not shown) when the rear door 192 is closed. When the rear door 192 is in the open position, the latch slot 194 is free to engage with the connection pin 142 of the vehicle door adjuster 10, as described below.

In operation, the vehicle door adjuster 10 is moved along the surface on which it is supported to a position adjacent the rear door 192. The vehicle door adjuster 10 can be moved manually or automatically, and can be rolled, slid, or carried.

Properly positioning the vehicle door adjuster 10 serves to allow alignment of the connection pin 142 with the latch slot 194, and makes it easier to adjust the rear door 192, and in particular requires less force for the adjustment. As indicated above, other structures may be used to align the connection pin 142 to the latch slot 194, and facilitate adjustment of the rear door 192.

Once properly positioned, the vehicle door adjuster 10 can be pressed toward the surface on which it is supported so that the grounding extensions 42 and 44 contact the surface. The pressing force must overcome the resistance of the caster springs 30 included in each caster assembly 20 in order for the vehicle door adjuster 10 to lower towards the surface. As the caster springs 30 are compressed, each caster assembly shaft 22 slides into corresponding vertical recesses of the frame 40, thereby bringing the vehicle door adjuster 10 closer to the surface. The vehicle door adjuster 10 can be pressed toward the surface by manual or automatic force exerted downward on the frame 40, grounding extensions 42 and 44, or any other structural component. In an embodiment that does not include caster assemblies 20, the vehicle door adjuster 10 is not pressed toward the surface and instead contacts the surface via feet or another static component.

Pressing the vehicle door adjuster 10 toward the surface on which it is supported serves to stabilize and support the vehicle door adjuster 10 while being operated. As indicated above, other structures may be used to stabilize and support the vehicle door adjuster 10.

While the vehicle door adjuster 10 is pressed toward the surface, the raising pedal 60 and the lowering pedal 80 can then each be pressed (such as by the user's foot) separately to modulate an appropriate height of the adjusting rod 130 to the extent necessary to vertically align the connection pin 142 with the latch slot 194 of the rear door 192. An initial height of the connection pin 142 determines whether the adjusting rod 130 needs to be moved up or down to align the connection pin 142 with the latch slot 194, and consequently, whether the raising pedal 60 or the lowering pedal 80 is pressed. Alternatively, the adjusting rod 130 can be moved up or down directly without pressing on either the raising pedal 60 or the lowering pedal 80 because the vehicle door adjuster 10 is not yet attached to the rear door 192.

Adjusting a height of the adjusting rod 130 serves to align the connection pin 142 with the latch slot 194 of the rear door 192 before the vehicle door adjuster 10 is engaged with the rear door 192. As indicated above, other mechanisms may be used to vertically align the connection pin 142 with the latch slot 194.

Once aligned at an appropriate height, the connection pin 142 and the latch slot 194 of the rear door 192 are engaged. The connection pin 142 is inserted into the latch slot 194 and the latch protrusion engages with the connection pin 142. The connection pin 142 and the latch slot 194 are therein secured together such that movement of one corresponds to movement of the other.

Engaging the connection pin 142 of the adjusting rod 130 with the latch slot 194 of the rear door 192 serves to physically connect the vehicle door adjuster 10 to the rear door 192, thereby allowing a transfer of force between the two. As indicated above, other structures may be used to engage the adjusting rod 130 with the rear door 192.

Once the connection pin 142 and the rear door 192 are engaged, the raising pedal 60 and the lowering pedal 80 can then each be pressed (such as by the user's foot) separately to raise or lower the adjusting rod 130 to simultaneously raise or lower the rear door 192. The rear door 192 is raised or lowered a distance corresponding to that which the adjusting rod 130 is raised or lowered by operation of the raising pedal 60 and the lowering pedal 80.

After adjusting the rear door 192 to a desirable height, the connection pin 142 can be disengaged from the latch slot 194. Pulling a door handle of the rear door 192 releases the latch protrusion from the connection pin 142, freeing the connection pin 142.

The vehicle door adjuster 10 is then moved along the surface on which it is supported away from the rear door 192 of the vehicle 190. With the vehicle door adjuster 10 out of the way and a height of the rear door 192 having been appropriately adjusted, the rear door 192 can be closed correctly so as to prevent potential wind noise or water leaks and achieve fit and finish standards

III. Rear Striker with Rear Door Latch Slot

Figure 3:
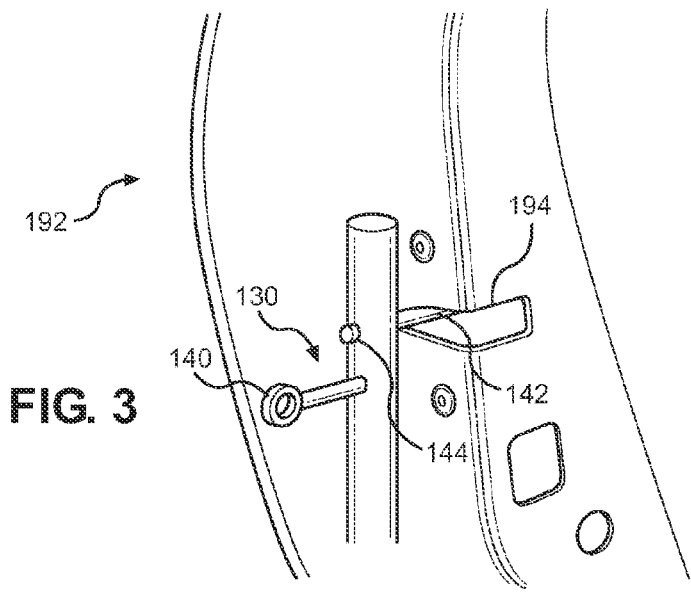
FIG. 3 is a perspective view of an exemplary connection pin of the vehicle door adjuster of FIG. 2 engaged with an exemplary latch slot of the vehicle door.

FIG. 3 is a perspective view of an exemplary connection pin of the vehicle door adjuster of FIG. 2 engaged with an exemplary latch slot of the vehicle door.

As shown in FIG. 3, the connection pin 142 is vertically aligned with the latch slot 194 of the rear door 192. The connection pin 142 extends into the latch slot 194 and engages with the latch protrusion (not shown) within an interior of the latch slot 194. Top and bottom sides of the connection pin 142 abut against upper and lower portions of the latch slot 194 in the engaged state. When the connection pin 142 is moved up or down by virtue of the adjusting rod 130 being moved up or down, the connection pin 142 pushes up or down on the latch slot 194 and thereby moves the rear door 192.

The connection pin 142 serves to engage the vehicle door adjuster 10 with the rear door 192 of the vehicle 190, and enables subsequent adjustment of the rear door 192. As indicated above, other structures may be used to engage and adjust the rear door 192.

IV. Upper and Lower Connection Pin Positions

Figure 4:
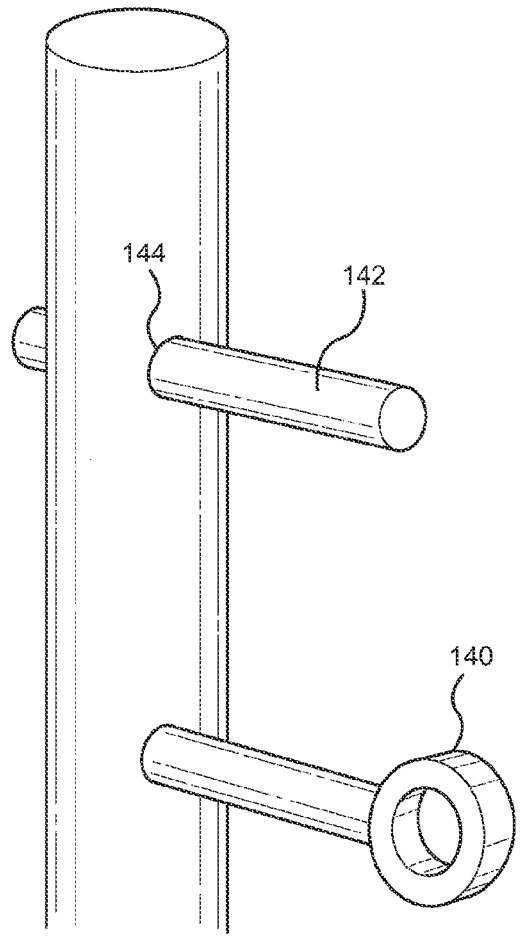
FIG. 4 is a perspective view of the exemplary connection pin of FIG. 2 at a higher position on the vehicle door adjuster in accordance with the disclosed subject matter.

FIG. 4 is a perspective view of the exemplary connection pin of FIG. 2 at a higher position on the vehicle door adjuster in accordance with the disclosed subject matter.

As shown in FIG. 4, the connection pin 142 of the present embodiment is inserted through the upper extension hole 144 of the top portion of the adjusting rod 130. The upper extension hole 144 is aligned with and positioned above the lower extension hole 144, which is described below. As discussed, this difference in height of the pair of extension holes 144 is due to the fact that the latch slot 194 of the rear door 192 is higher than the latch slot of the front door (not shown), and the connection pin 142 therefore must be positioned higher on the adjusting rod 130 when engaging with the latch slot 194 of the rear door 192. However, the pair of extension holes 144 may be replaced by a single extension hole, and the extension hole that aligns with the latch slot 194 of the rear door 192 may in fact be lower on the adjusting rod 130 than the extension hole that aligns with the latch slot of the front door.

The connection pin 142 serves to configure the adjusting rod 130 so that the vehicle door adjuster 10 may interact with the latch slot 194 of the rear door 192. As indicated, other structures may be used to configure the adjusting rod 130.

Figure 5:
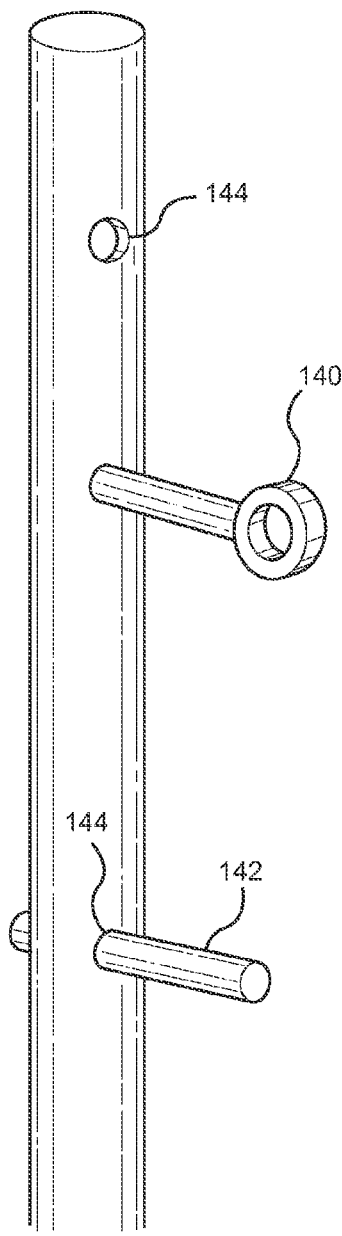
FIG. 5 is a perspective view of the exemplary connection pin of FIG. 2 at a lower position on the vehicle door adjuster in accordance with the disclosed subject matter.

FIG. 5 is a perspective view of the exemplary connection pin of FIG. 2 at a lower position on the vehicle door adjuster in accordance with the disclosed subject matter.

As shown in FIG. 5, the connection pin 142 of the present embodiment is inserted through the lower extension hole 144 of the top portion of the adjusting rod 130. The lower extension hole 144 is aligned with and positioned below the upper extension hole 144, which is described above. This difference in height of the pair of extension holes 144 is due to the fact that a latch slot of a front door is lower than the latch slot 194 of the rear door 192, and the connection pin 142 therefore does not need to be positioned as high on the adjusting rod 130 when engaging with the latch slot of the front door. However, the pair of extension holes 144 may in fact be replaced by a single extension hole, and the extension hole that aligns with the latch slot of the front door may in fact be higher on the adjusting rod 130 than the extension hole that aligns with the latch slot of the rear door.

The connection pin 142 serves to configure the adjusting rod 130 so that the vehicle door adjuster 10 may interact with the latch slot of the front door. As indicated, other structures may be used to configure the adjusting rod 130.

V. Vehicle Door Adjuster with Raising Pedal

FIG. 7 is a side view of the exemplary vehicle door adjuster of FIG. 1 in accordance with the disclosed subject matter.

As shown in FIG. 7, the vehicle door adjuster 10 includes the raising pedal 60 attached to the pedal post 50 by the post pin 52 inserted through the raising beam 62. Specifically, the post pin 52 is inserted through the raising post slot 66 in the raising beam 62. As shown in more detail in FIG. 14, the raising post slot 66 has an oblong shape so that the raising beam 62 can slide horizontally back and forth around the post pin 52 as the raising beam 62 pivots up and down. This horizontal back and forth movement of the raising beam 62 around the post pin 52 is due to the fact that the raising beam 62 is rotatably attached to the adjusting rod 130 at the adjusting rod hole 68. Actuation of the raising pedal 60 moves the adjusting rod 130 upward, thereby forcing the raising pedal platform 64 of the raising pedal 60 to slide closer to the pedal post 50. As the raising pedal 60 slides closer to the pedal post 50, the post pin 52 slides back towards the raising pedal platform 64 within the raising post slot 66 relative to the raising pedal 60. This configuration resolves inconsistencies between the up and down movement of the adjusting rod 130 and the arcuate movement of the raising pedal 60. The raising post slot 66 can also be shaped as a circular hole while the adjusting rod hole 68 is oblong shaped, or any other configuration made to accommodate for the differences in movement.

The raising post slot 66 serves to allow the raising pedal 60 and the adjusting rod 130 to be smoothly connected and operated. As indicated above, other configurations may be used to facilitate smooth movement of the raising pedal 60 and the adjusting rod 130.

VI. Methods of Operation

As shown in the figures, the vehicle door adjuster 10 can be configured to adjust either a front or rear vehicle door. Before adjusting a vehicle door, the connection pin 142 is inserted into the correct extension hole 144 of adjusting rod 130. In this case, the connection pin 142 must be inserted into the upper extension hole 144 of the adjusting rod 130.

The vehicle door adjuster is moved to a position adjacent to the vehicle 190 at an open door such as the rear door 192. At this point, the frame 40 may be pressed down toward the ground surface so that the grounding extensions 42 and 44 contact the ground. This stabilizes the vehicle door adjuster 10 and will permit operation of the raising pedal 60 and the lowering pedal 80.

Then, either the raising pedal 60 or the lowering pedal 80 is pressed to raise or lower the adjusting rod 130 and the attached connection pin 142. In raising or lowering the connection pin 142, the goal is to vertically align the connection pin 142 with the latch slot 194 of the rear door 192. If the raising pedal 60 or the lowering pedal 80 has been pressed to the extent that the connection pin 142 has moved too far up or down past the latch slot 194, the other pedal can be pressed to bring the connection pin 142 back into alignment.

Once the connection pin 142 is vertically aligned with the latch slot 194, they are engaged. To engage, the connection pin 142 slides into the latch slot 194, and a latch protrusion (not shown) engages with the connection pin 142. This engagement locks the vehicle door adjuster 10 and the rear door 192 together.

After the vehicle door adjuster 10 and the rear door 192 have been engaged, either the raising pedal 60 or the lowering pedal 80 are pressed to move the rear door 192 up or down. Because the connection pin 142 connects the adjusting rod 130 and the rear door 192, any movement of the adjusting rod 130 by the pedals will transfer to movement of the rear door 192. Both the raising pedal 60 and the lowering pedal 80 may be used to intermittently raise and lower the rear door 192 until the correct position has been achieved.

At this point, the vehicle door adjuster 10 can be disengaged from the rear door 192 by pulling open the handle of the rear door 192 and releasing the latch protrusion. The vehicle door adjuster 10 may then be moved away from the vehicle 190 and out of the way.

The methods and apparatus disclosed above are beneficial for various reasons, for example, the adjuster utilizes structure similar to that found on the vehicle by including a connection pin that interacts with the door latch in a similar way as a vehicle striker bar. Because the vehicle door has a latch that is already configured to interact with the vehicle striker, no adjustments are necessary to facilitate the vehicle door interacting with the connection pin of the adjuster. Additionally, the adjuster incorporates improved ergonomics for technicians and other users for adjusting vehicle doors, particularly due to the mechanical advantage that the adjuster provides. Also, the adjuster facilitates more accurate adjustment of the vehicle door because the actuator can be more precisely operated than a direct force application on the vehicle door. Finally, the structure of the adjuster is such that the apparatus is easy to transport to various locations including those along an assembly line or amidst manufacturing operations.

VII. Alternative Embodiments of FIGS. 17-20

FIGS. 17-20 show an alternative embodiment of the exemplary vehicle door adjuster 10 in accordance with the disclosed subject matter.

As shown in the alternate embodiment of FIG. 17-20, the connection pin 142 is inserted through the extension hole 144 to lock together the adjusting rod 130 and either a front door extension 160 or a rear door extension 180. The extension hole 144 of the adjusting rod 130 overlaps with corresponding holes in the front door extension 160 and the rear door extension 180 so that the connection pin 142 is likewise insertable. There can also be more than one extension hole 144 extending through the adjusting rod 130, and the positioning of the extension hole or holes 144 may vary.

The extension hole 144 and the connection pin 142 serve to lock together the adjusting rod 130 and the front and rear door extensions 160 and 180. As indicated above, other structures may be used to lock together the adjusting rod 130 and the front and rear door extensions 160 and 180.

As shown in detail in FIGS. 17-20, the front door extension 160 and the rear door extension 180 may each be removably attached to the top end of the adjusting rod 130.

The front door extension 160 has a front striker 164 attached to a side of a top portion of a front rod 162. The front rod 162 is cylindrical in shape, but can also be rectangular or otherwise polygonal in cross section. A base of the front rod 162 is configured to attach to the top end of the adjusting rod 130 by being threaded, tapered, or otherwise insertable. The front striker 164 can be attached to the front rod 162 by welding, use of adhesives or fixtures such as screws or bolts, etc. The front striker 164 includes a front striker plate 166 attached perpendicular to a front striker bar 168, a back side of the front striker plate 166 being attached to the front rod 162. The front striker bar 168 may also be attached to the front striker plate 166 by welding, use of adhesives or fixtures such as screws or bolts, etc. The front striker bar 168 defines an open space between itself and the front striker plate 166 through which the latch protrusion (not shown) of a vehicle door is inserted, as described below. The front striker bar 168 can be U-shaped, semicircular, or another shape defining an open space within a perimeter.

The rear door extension 180 has a rear striker 184 attached to a side of a top portion of a rear rod 182. The rear rod 182 is cylindrical in shape, but can also be rectangular or otherwise polygonal in cross section. A base of the rear rod 182 is configured to attach to the top end of the adjusting rod 130 by being threaded, tapered, or otherwise insertable. The rear striker 184 can be attached to the rear rod 182 by welding, use of adhesives or fixtures such as screws or bolts, etc. The rear striker 184 includes a rear striker plate 186 attached perpendicular to a rear striker bar 188, a back side of the rear striker plate 186 being attached to the rear rod 182. The rear striker bar 188 may also be attached to the rear striker plate 186 by welding, use of adhesives or fixtures such as screws or bolts, etc. The rear striker bar 188 defines an open space between itself and the rear striker plate 186 through which the latch protrusion of the vehicle door is inserted, as described below. The rear striker bar 188 can be U-shaped, semicircular, or another shape defining an open space within a perimeter.

The front door extension 160 and the rear door extension 180 serve to extend the adjusting rod 130 to engage the vehicle door so that movement of the adjusting rod 130 moves the vehicle door up or down. As indicated above, other structures may be used to extend the adjusting rod 130 and engage the vehicle door.

Figure 17:
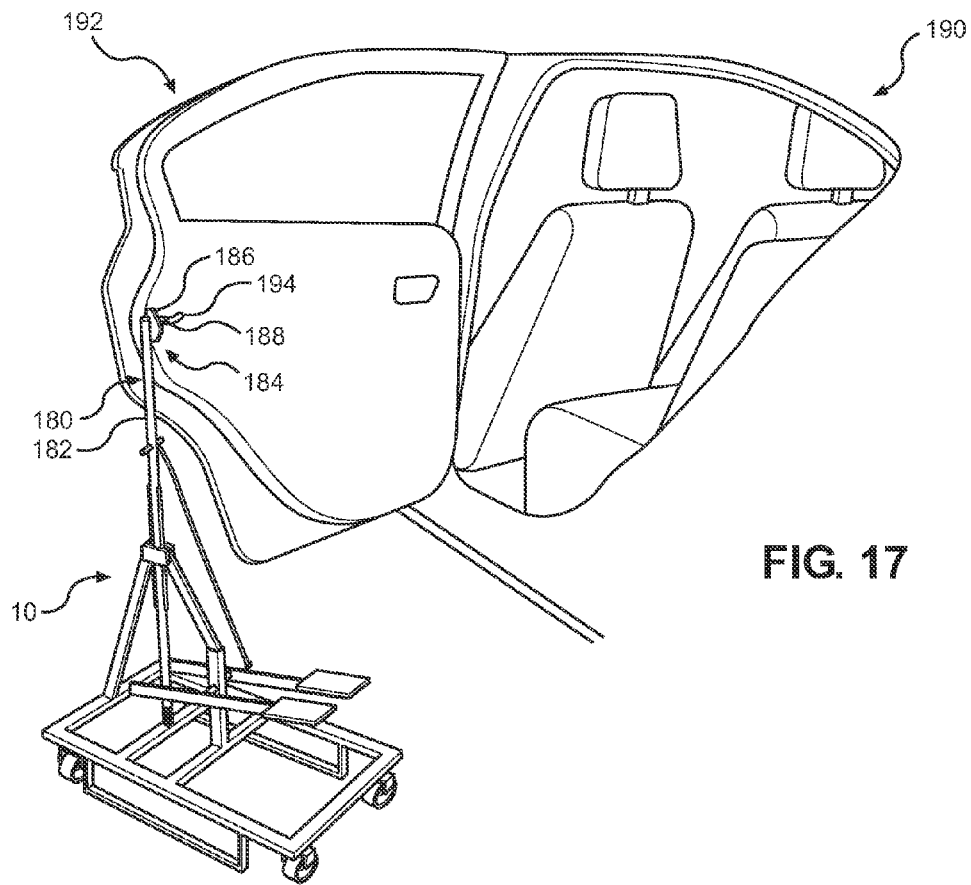
FIG. 17 is a perspective view of an alternate embodiment of the vehicle door adjuster of FIG. 1 in use with the exemplary vehicle.

FIG. 17 is a perspective view of an alternate embodiment of the vehicle door adjuster of FIG. 1 in use with the exemplary vehicle.

FIG. 17 particularly illustrates an alternate embodiment of the vehicle door adjuster 10, made in accordance with the principles of the disclosed subject matter, in use with a vehicle 190. As shown, the vehicle 190 has a rear door 192 that is in an open position. The rear door 192 includes a latch slot 194 configured to engage with a vehicle striker (not shown) when the rear door 192 is closed. When the rear door 192 is in the open position, the latch slot 194 is free to engage with the rear striker 184 of the vehicle door adjuster 10, as described below.

In operation, the vehicle door adjuster 10 is moved along the surface on which it is supported to a position adjacent the rear door 192. The vehicle door adjuster 10 can be moved manually or automatically, and can be rolled, slid, or carried.

Properly positioning the vehicle door adjuster 10 serves to allow alignment of the rear striker 184 with the latch slot 194, and makes it easier to adjust the rear door 192, and in particular requires less force for the adjustment. As indicated above, other structures may be used to align the rear striker 184 to the latch slot 194, and facilitate adjustment of the rear door 192.

Once properly positioned, the vehicle door adjuster 10 can be pressed toward the surface on which it is supported so that the grounding extensions 42 and 44 contact the surface. The pressing force must overcome the resistance of the caster springs 30 included in each caster assembly 20 in order for the vehicle door adjuster 10 to lower towards the surface. As the caster springs 30 are compressed, each caster assembly shaft 22 slides into corresponding vertical recesses of the frame 40, thereby bringing the vehicle door adjuster 10 closer to the surface. The vehicle door adjuster 10 can be pressed toward the surface by manual or automatic force exerted downward on the frame 40, grounding extensions 42 and 44, or any other structural component. In an embodiment that does not include caster assemblies 20, the vehicle door adjuster 10 is not pressed toward the surface and instead contacts the surface via feet or another static component.

Pressing the vehicle door adjuster 10 toward the surface on which it is supported serves to stabilize and support the vehicle door adjuster 10 while being operated. As indicated above, other structures may be used to stabilize and support the vehicle door adjuster 10.

While the vehicle door adjuster 10 is pressed toward the surface, the raising pedal 60 and the lowering pedal 80 can then each be pressed (such as by the user's foot) separately to modulate an appropriate height of the adjusting rod 130 to the extent necessary to vertically align the rear striker 184 with the latch slot 194 of the rear door 192. An initial height of the rear striker 184 determines whether the adjusting rod 130 needs to be moved up or down to align the rear striker 184 with the latch slot 194, and consequently, whether the raising pedal 60 or the lowering pedal 80 is pressed. Alternatively, the adjusting rod 130 can be moved up or down directly without pressing on either the raising pedal 60 or the lowering pedal 80 because the vehicle door adjuster 10 is not yet attached to the rear door 192.

Adjusting a height of the adjusting rod 130 serves to align the rear striker 184 with the latch slot 194 of the rear door 192 before the vehicle door adjuster 10 is engaged with the rear door 192. As indicated above, other mechanisms may be used to vertically align the rear striker 184 with the latch slot 194.

Once aligned at an appropriate height, the rear striker 184 and the latch slot 194 of the rear door 192 are engaged. The rear striker bar 188 of the rear striker 184 is inserted into the latch slot 194 and the latch protrusion engages with the open space defined between the rear striker bar 188 and the rear striker plate 186. The rear striker 184 and the latch slot 194 are therein secured together such that movement of one corresponds to movement of the other.

Engaging the rear striker 184 of the adjusting rod 130 with the latch slot 194 of the rear door 192 serves to physically connect the vehicle door adjuster 10 to the rear door 192, thereby allowing a transfer of force between the two. As indicated above, other structures may be used to engage the adjusting rod 130 with the rear door 192.

Once the rear striker 184 and the rear door 192 are engaged, the raising pedal 60 and the lowering pedal 80 can then each be pressed (such as by the user's foot) separately to raise or lower the adjusting rod 130 to simultaneously raise or lower the rear door 192. The rear door 192 is raised or lowered a distance corresponding to that which the adjusting rod 130 is raised or lowered by operation of the raising pedal 60 and the lowering pedal 80.

After adjusting the rear door 192 to a desirable height, the rear striker 184 can be disengaged from the latch slot 194. Pulling a door handle of the rear door 192 releases the latch protrusion from the open space between the rear striker bar 188 and the rear striker plate 186, freeing the rear striker 184.

The vehicle door adjuster 10 is then moved along the surface on which it is supported away from the rear door 192 of the vehicle 190. With the vehicle door adjuster 10 out of the way and a height of the rear door 192 having been appropriately adjusted, the rear door 192 can be closed correctly.

Figure 18:
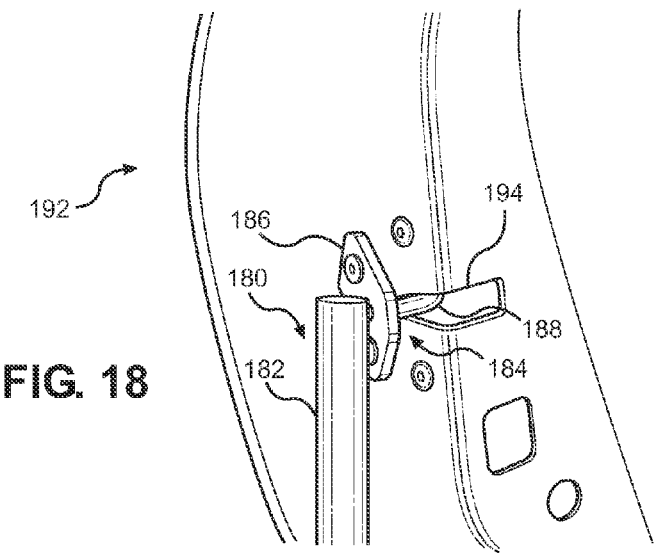
FIG. 18 is a perspective view of an exemplary rear striker of the vehicle door adjuster of FIG. 17 engaged with the exemplary latch slot of the vehicle door.

FIG. 18 is a perspective view of an exemplary rear striker of the vehicle door adjuster of FIG. 17 engaged with the exemplary latch slot of the vehicle door.

As shown in FIG. 18, the rear striker bar 188 of the rear striker 184 is vertically aligned with the latch slot 194 of the rear door 192. The rear striker bar 188 extends into the latch slot 194 and engages with the latch protrusion (not shown) within an interior of the latch slot 194. Top and bottom sides of the rear striker bar 188 abut against upper and lower portions of the latch slot 194 in the engaged state. When the rear striker bar 188 is moved up or down by virtue of the adjusting rod 130 being moved up or down, the rear striker bar 188 pushes up or down on the latch slot 194 and thereby moves the rear door 192.

The rear striker bar 188 serves to engage the vehicle door adjuster 10 with the rear door 192 of the vehicle 190, and enables subsequent adjustment of the rear door 192. As indicated above, other structures may be used to engage and adjust the rear door 192.

Figure 19:
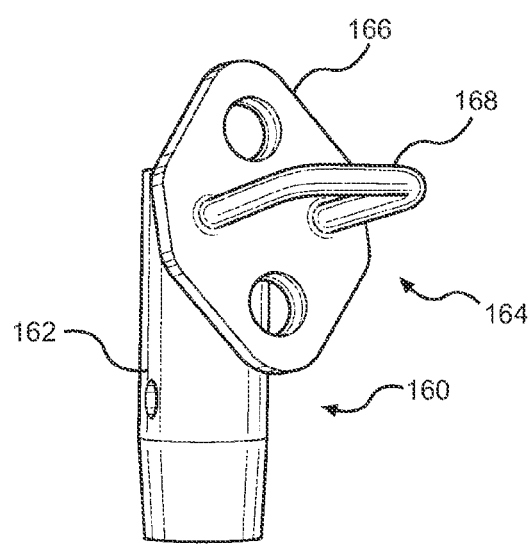
FIG. 19 is a perspective view of an exemplary front door extension in accordance with the disclosed subject matter.

FIG. 19 is a perspective view of an exemplary front door extension in accordance with the disclosed subject matter.

As shown in FIG. 19, the front door extension 160 of the present embodiment includes the front rod 162 attached to the front striker 164. The front rod 162 has a length shorter than that of the rear rod 182, which is described below. This difference in length is due to the fact that a latch slot of a front door is lower than the latch slot 194 of the rear door 192, and the front striker 164 therefore does not need to extend as high above the adjusting rod 130. However, the front rod 162 can also be equal in length to the rear rod 182, or even longer.

Additionally, a bottom portion of the front rod 162 is tapered so that it may be inserted into a top portion of the adjusting rod 130. The taper ensures the front rod 162 and the adjusting rod 130 will be firmly connected to one another. The front rod 162 may also be threaded at the bottom portion so that it can be screwed into the top portion of the adjusting rod 130. Furthermore, as shown in more detail in FIG. 12, a hole can be provided extending through a center of the front rod 162 that overlaps with an extension hole 144 extending through the adjusting rod 130 when the front rod 162 is inserted therein. An connection pin 142 is then inserted through both overlapping holes to lock together the front rod 162 and the adjusting rod 130.

The front door extension 160 serves to raise the reach of the adjusting rod 130 by an length extension so that the vehicle door adjuster 10 may interact with the latch slot of the front door. As indicated above, other structures may be used to extend the adjusting rod 130.

Figure 20:
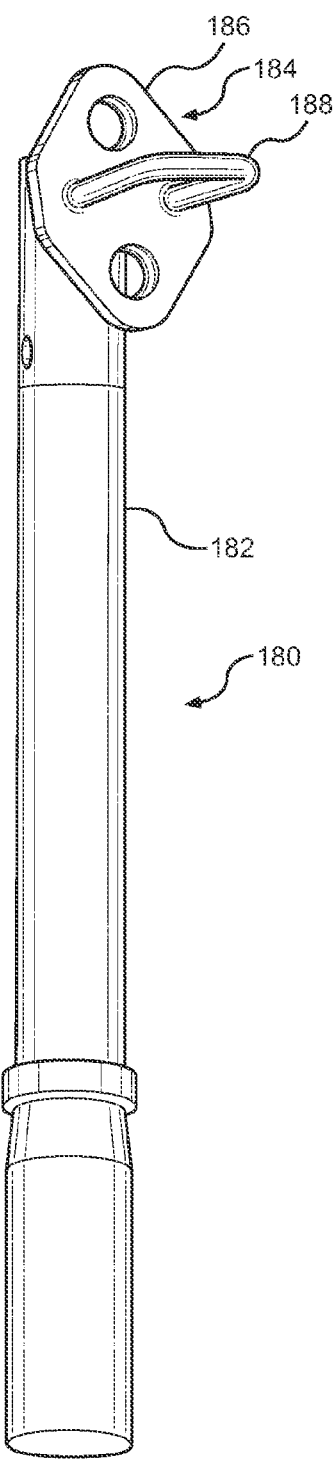
FIG. 20 is a perspective view of the exemplary rear door extension of FIG. 17 in accordance with the disclosed subject matter.

FIG. 20 is a perspective view of the exemplary rear door extension of FIG. 17 in accordance with the disclosed subject matter.

As shown in FIG. 20, the rear door extension 180 of the present embodiment includes the rear rod 182 attached to the rear striker 184. The rear rod 182 has a length longer than that of the front rod 162. This is because the latch slot 194 of the rear door 192 is higher than the latch slot of the front door, and the rear striker 184 therefore must extend higher above the adjusting rod 130. However, the rear rod 182 can also be equal in length to the front rod 162, or even shorter.

Additionally, a bottom portion of the rear rod 182 is tapered so that it may be inserted into a top portion of the adjusting rod 130. The taper ensures that the rear rod 182 and the adjusting rod 130 will be firmly connected to one another. The rear rod 182 may also be threaded at the bottom portion so that it can be screwed into the top portion of the adjusting rod 130. Furthermore, as shown in more detail in FIG. 12, a hole can be provided extending through a center of the rear rod 182 that overlaps with the extension hole 144 extending through the adjusting rod 130 when the rear rod 182 is inserted. The connection pin 142 is then inserted through both overlapping holes to lock together the rear rod 182 and the adjusting rod 130.

The rear door extension 180 serves to raise the reach of the adjusting rod 130 by a length extension so that the vehicle door adjuster 10 may interact with the latch slot 194 of the rear door 192. As indicated above, other structures may be used to extend the adjusting rod 130.

VIII. Alternative Embodiments

While certain embodiments of the invention are described above, and FIGS. 1-16 disclose the best mode for practicing the various inventive aspects, it should be understood that the invention can be embodied and configured in many different ways without departing from the spirit and scope of the invention.

In the disclosed embodiments, the invention is applied to vehicle doors. However, the invention could be applied or modified to adjust other components of vehicles such as body panels. In fact, the invention can even have applications outside of vehicles.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

In exemplary embodiments of the invention, the vehicle door adjuster includes pedals to be foot-operated. However, any mechanism can be used to conveniently raise and lower the vehicle door adjuster attachment that raises or lowers a vehicle door, such as hand-operated levers.

Additionally, the vehicle door adjuster includes a latch striker to engage a latch slot in the vehicle door, whereby force on the vehicle door adjuster pedals can be transferred to force on the vehicle door. However, the vehicle door adjuster can also be connected to the vehicle door by any structure other than the latch slot.

In embodiments disclosed in the context of FIGS. 1-16, the vehicle door adjuster is configured to transfer force in a vertical direction to the vehicle door. However, the vehicle door adjuster may also be configured to transfer force horizontally, adjusting the vehicle door in a side to side manner. Further, the vehicle door adjuster may be oriented to transfer force in any direction, thereby adjusting the vehicle door in any direction.

Embodiments are also intended to include or otherwise cover methods of using and methods of manufacturing any or all of the elements disclosed above. The methods of manufacturing include or otherwise cover processors and computer programs implemented by processors used to design various elements of the vehicle door adjuster disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An adjuster supported by a static surface for adjusting a position of a vehicle door relative to other vehicle components of a vehicle, the vehicle including a striker that is configured to communicate with and be held by a latch of the door to enable the door to be held in a fully closed position, the vehicle also including a release mechanism that enables the striker to be released from the latch to thereby enable the door to be released from the fully closed position and maneuvered into an open position, the adjuster comprising:
a pin that is configured to be held by the vehicle door latch so as to form a rigid connection between the pin and the vehicle door, the pin also being configured to be released from the vehicle door latch upon actuation of the vehicle release mechanism;
a frame configured to be supported by the static surface; and
a manual actuator assembly having a pedal that connects the frame to the pin, and that is configured to displace the pin by a predetermined distance upon depressing the pedal to thereby move the vehicle door to a position in which the vehicle door latch and the vehicle striker are aligned;
wherein the manual actuator assembly includes a rod that connects the pin to the frame, and the pedal is configured as a raising pedal connected to one end of a raising beam, and a pivot bar is connected to the frame and to an intermediate portion of the raising beam to enable pivoting movement of the raising pedal and the raising beam relative to the frame, an opposite end of the raising beam being rotatably connected to a lower portion of the rod such that manually actuating the raising pedal downwardly moves the rod in an upward direction.

2. The adjuster according to claim 1, wherein the pin is configured to be held by the vehicle door latch in substantially the same way as the vehicle striker.

3. The adjuster according to claim 2, wherein the pin is substantially cylindrical and extends perpendicular to a direction of movement of the vehicle door.

4. The adjuster according to claim 1, wherein the frame includes a main frame and wheels connected to a lower surface of the main frame that enable the adjuster to be manually moved between different locations.

5. The adjuster according to claim 4, wherein the frame includes grounding extensions attached to the lower surface of the main frame, and telescoping shafts that connect the wheels to the lower surface of the main frame.

6. The adjuster according to claim 5, wherein the telescoping shafts are movable between a fully extended position and a fully retracted position, the fully extended position resulting in the combined height of the wheels and the telescoping shafts as being greater than a height of the grounding extensions, while the fully retracted position resulting in the combined height of the wheels and the telescoping shafts as being less than the height of the grounding extensions, the telescoping shafts being movable between the fully retracted and fully extended positions based on an amount of downward force applied to the main frame.

7. The adjuster according to claim 1, wherein the frame includes an adjusting rod guide extension that extends from an upper surface of the frame and within a hollow portion of the rod so as to guide vertical movement of the rod.

8. The adjuster according to claim 7, wherein the manual actuator assembly includes a guide block and braces, the guide block defining a channel through which the rod extends, and the braces rigidly connecting the guide block to the frame.

9. The adjuster according to claim 1, wherein the manual actuator assembly includes a lowering pedal connected to one end of a lowering beam, the pivot bar being connected to a mid-point of the lowering beam to enable pivoting movement of the lowering pedal and the lowering beam relative to the frame, the lowering beam also including a cable having one end that is connected to the lowering beam at a location between the mid-point and the one end of the lowering beam, an opposite end of the cable being connected to the lowering beam at a location between the mid-point and an end opposite the one end of the lowering beam, the lowering beam also including a hook attached to an upper section of the rod, the hook defining a channel through which the cable extends, such that manually actuating the lowering pedal downwardly moves the rod in a downward direction.

10. A method of manufacturing an adjuster supported by a static surface for adjusting a position of a vehicle door relative to other vehicle components of a vehicle, the vehicle including a striker that is configured to communicate with and be held by a latch of the door to enable the door to be held in a fully closed position, the vehicle also including a release mechanism that enables the striker to be released from the latch to thereby enable the door to be released from the fully closed position and maneuvered into an open position, the method of manufacturing comprising:
configuring a pin to be held by the vehicle door latch so as to form a rigid connection between the pin and the vehicle door, the pin also being configured to be released from the vehicle door latch upon actuation of the vehicle release mechanism;
connecting the pin to a frame supported by the static surface with a manual actuator assembly having a pedal and a rod;
configuring the manual actuator assembly to displace the pin by a predetermined distance upon depressing the pedal to thereby move the vehicle door to a position in which the vehicle door latch and the vehicle striker are aligned; and
configuring the pedal as a raising pedal connected to one end of a raising beam, wherein a pivot bar is connected to the frame and to an intermediate portion of the raising beam to enable pivoting movement of the raising pedal and the raising beam relative to the frame, an opposite end of the raising beam being rotatably connected to a lower portion of the rod such that manually actuating the raising pedal downwardly moves the rod in an upward direction.

11. The method of manufacturing according to claim 10, further including configuring the pin to be held by the vehicle door latch in substantially the same way as the vehicle striker.

12. The method of manufacturing according to claim 11, further including configuring the pin to be substantially cylindrical and to extend perpendicular to a direction of movement of the vehicle door.

13. The method of manufacturing according to claim 10, further including configuring the frame to include a main frame and wheels connected to a lower surface of the main frame that enable the adjuster to be manually moved between different locations.

14. The method of manufacturing according to claim 13, further including configuring the frame to include grounding extensions attached to the lower surface of the main frame, and telescoping shafts that connect the wheels to the lower surface of the main frame.

15. The method of manufacturing according to claim 14, further including configuring the telescoping shafts to be movable between a fully extended position and a fully retracted position, the fully extended position resulting in the combined height of the wheels and the telescoping shafts as being greater than a height of the grounding extensions, while the fully retracted position resulting in the combined height of the wheels and the telescoping shafts as being less than the height of the grounding extensions, the telescoping shafts being movable between the fully retracted and fully extended positions based on an amount of downward force applied to the main frame.

16. The method of manufacturing according to claim 10, further including wherein the frame includes an adjusting rod guide extension that extends from an upper surface of the frame and within a hollow portion of the rod so as to guide vertical movement of the rod.

17. The method of manufacturing according to claim 16, further including configuring the manual actuator assembly to include a guide block and braces, the guide block defining a channel through which the rod extends, and the braces rigidly connecting the guide block to the frame.

18. A method of adjusting a position of a vehicle door relative to other vehicle components of a vehicle supported by a static surface, the vehicle including a striker that is configured to communicate with and be held by a latch of the door to enable the door to be held in a fully closed position, the vehicle also including a release mechanism that enables the striker to be released from the latch to thereby enable the door to be released from the fully closed position and maneuvered into an open position, the method comprising:
opening the vehicle door;
configuring an adjuster to include an actuator pedal, a pivot bar, a raising beam, a frame, a rod, and a pin, the actuator pedal is connected to one end of the raising beam, the pivot bar is connected to the frame and to an intermediate portion of the raising beam to enable pivoting movement of the actuator pedal and the raising beam relative to the frame, an opposite end of the raising beam being rotatably connected to a lower portion of the rod such that manually actuating the raising pedal downwardly moves the rod in an upward direction;

moving the adjuster to be proximate the open vehicle door and so as to be supported on the static surface;

maneuvering the pin of the adjuster so as to be held by the vehicle door latch so as to form a rigid connection between the pin and the vehicle door;

manually operating the actuator pedal of the adjuster to displace the pin by a predetermined distance to thereby move the vehicle door to a position in which the vehicle door latch and the vehicle striker are aligned; and actuating the vehicle release mechanism so that the pin is released from the vehicle door latch.

\* \* \* \* \*

UNITED STATES PATENT AND TRADEMARK OFFICE
CERTIFICATE OF CORRECTION

Page 1 of 1

PATENT NO. : 9,994,271 B2
APPLICATION NO. : 14/804329
DATED : June 12, 2018
INVENTOR(S) : Eric Vanderpool et al.

It is certified that error appears in the above-identified patent and that said Letters Patent is hereby corrected as shown below:

On the Title Page

Item [72], should read:
Eric Vanderpool, Batesville, IN (US);
Bryan MERMOUD, Shelbyville, IN (US);
William Tyler SELF, Butlerville, IN (US);
Micah REDWINE, Shelbyville, IN (US)

Signed and Sealed this
Twenty-first Day of August, 2018

Andrei Iancu
*Director of the United States Patent and Trademark Office*